(12) United States Patent
Begert

(10) Patent No.: US 12,116,217 B2
(45) Date of Patent: Oct. 15, 2024

(54) APPARATUS AND METHOD FOR SEQUENCING LOADING UNITS IN A PREDETERMINED ORDER

(71) Applicant: Stöcklin Logistic AG, Laufen (CH)

(72) Inventor: Urs Begert, Ipsach (CH)

(73) Assignee: STÖCKLIN LOGISTIK AG, Laufin (CH)

( * ) Notice: Subject to any disclaimer, the term of this patent is extended or adjusted under 35 U.S.C. 154(b) by 214 days.

(21) Appl. No.: 17/896,555

(22) Filed: Aug. 26, 2022

(65) Prior Publication Data
US 2023/0087770 A1 Mar. 23, 2023

(30) Foreign Application Priority Data
Sep. 22, 2021 (DE) ..................... 10 2021 124 545.1

(51) Int. Cl.
*B65G 47/32* (2006.01)
*B65G 37/02* (2006.01)
*B65G 47/30* (2006.01)
*B65G 47/76* (2006.01)
*B65G 47/88* (2006.01)

(52) U.S. Cl.
CPC ............. *B65G 47/32* (2013.01); *B65G 37/02* (2013.01); *B65G 47/766* (2013.01); *B65G 47/8876* (2013.01)

(58) Field of Classification Search
CPC ........ B65G 37/02; B65G 47/30; B65G 47/32; B65G 47/766; B65G 47/8876
USPC ......................................................... 198/434
See application file for complete search history.

(56) References Cited

U.S. PATENT DOCUMENTS

| 3,583,545 | A |   | 6/1971 | Hovekamp |   |
|---|---|---|---|---|---|
| 4,018,324 | A | * | 4/1977 | Kamphues | B65G 47/32 414/931 |
| 4,273,489 | A | * | 6/1981 | Lingl, Jr. | B65G 47/26 414/931 |
| 4,630,725 | A | * | 12/1986 | Steurmer | B65B 25/06 198/419.3 |
| 5,988,356 | A | * | 11/1999 | Bonnet | B65G 47/766 198/370.1 |
| 6,662,929 | B1 | * | 12/2003 | Neary | B65G 47/31 198/572 |

(Continued)

FOREIGN PATENT DOCUMENTS

| EP | 1 617 958 B1 | 2/2010 |
|---|---|---|
| EP | 2 163 498 B1 | 4/2011 |

(Continued)

*Primary Examiner* — Douglas A Hess
(74) *Attorney, Agent, or Firm* — Rod D. Baker

(57) ABSTRACT

Loading units are collections of goods to be placed in sequence and compiled, as onto a pallet, for shipment. An apparatus is provided for sequencing loading units in a predetermined order. The apparatus includes a sequencing zone with a plurality of belts for receiving units to be sequenced, and a feeding device for units arranged upstream of the sequencing zone. Also included is a separation device with intakes for loading units. A distribution device distributes units onto the belts; a relocation device conveys separated units toward a downstream conveying device. The distribution device and the relocation device include a transverse pusher for pushing the units transversely to the belts or the intakes.

11 Claims, 23 Drawing Sheets

(56) References Cited

U.S. PATENT DOCUMENTS

| | | | | |
|---|---|---|---|---|
| 7,306,087 B1* | 12/2007 | Hamsten | .............. | B65G 47/715 |
| | | | | 198/429 |
| 8,534,451 B2* | 9/2013 | Damen | ................ | B65G 47/682 |
| | | | | 198/367 |
| 8,770,909 B2* | 7/2014 | Parker | .................... | B65G 57/03 |
| | | | | 901/41 |
| 8,875,869 B1* | 11/2014 | Burchell | .............. | B65G 57/035 |
| | | | | 198/419.3 |
| 9,670,007 B2* | 6/2017 | Beesley | ............. | B65G 47/1492 |
| 10,336,557 B2* | 7/2019 | Wittmann | ............ | B65G 47/088 |
| 10,773,898 B2* | 9/2020 | Perrot | .................... | B65G 43/08 |
| 2016/0362257 A1* | 12/2016 | Papsdorf et al. | | |

FOREIGN PATENT DOCUMENTS

| | | | | |
|---|---|---|---|---|
| EP | 2 306 379 A1 | 4/2011 | | |
| FR | 2 676 955 A1 | 12/1992 | | |
| WO | WO-2013001203 A1 * | 1/2013 | .............. | B65B 5/08 |

* cited by examiner

APPARATUS AND METHOD FOR SEQUENCING LOADING UNITS IN A PREDETERMINED ORDER

CROSS-REFERENCE TO RELATED APPLICATIONS

This application claims priority to German Patent Application No. DE 10 2021 124 545.1, filed 22 Sep. 2021, the entire contents of which are incorporated herein by reference.

BACKGROUND OF THE INVENTION

Field of the Invention

The present invention relates to an apparatus for sequencing loading units, such as shipping containers, in a predetermined order. The invention has a sequencing zone with a plurality of belts for receiving loading units to be sequenced, and a feeding apparatus for loading units. The feeding apparatus is arranged upstream of the sequencing zone and a separation apparatus for loading units, which separation apparatus is arranged downstream of the sequencing zone with intakes. There is a distribution apparatus distributing the loading units onto the belts and a relocation apparatus conveying the separated loading units in the direction towards a conveying device arranged downstream of the apparatus. The invention also further relates to a method for sequencing loading units in a predetermined order.

Background Information

There is a need for an apparatus and method for sequencing loading units in a proper order for loading and shipment. Loading units may be packages or containers which are required in the selection of products for shipment or distribution to retail outlets or branches. In the process, a branch pallet required for the respective operation is stacked with of a multiplicity of loading units or containers holding different products. These units or loading units are put together on a load carrier in the form, for example, of a pallet, wherein the units are compiled into stacks of products on the pallet— often in a predetermined order specified by the destination branch.

Examples of such loading units which need to be handled with special care during picking are stackable containers of piece goods, containing fruit and vegetable products. The loading units may therefore be disposable containers in the form of boxes, for example, or they may be reusable containers which are made of materials like plastic or cardboard, or else as folding boxes, such as containers with foldable side walls.

Shipping of fresh produce is often performed from the wholesaler in the form of said containers which must be stacked on load carriers in the form of pallets or roll cages appropriately for the branch concerned. When stacking, a significant role is played here by the order already mentioned above, this being ensured by operating staff when the load is stacked on the load carrier manually and being specified by a control device in the form, for example, of a master computer when the load carrier is loaded automatically. The loading units therefore need to be stacked on the load carrier for the branch in a predetermined order. From the respective storage area, in which the loading units are stacked, for example, on pallets which are in each case supplied by the supplier with the same goods in or on loading units, the loading units must be depalleted and sequenced.

EP 2 306 379 A1 discloses a method for controlling material flows by which, in particular in vehicle manufacture, materials or components can be provided in the production plant at the right time and in the right quantity. Unlike this known method, the problem underlying the present invention is to provide an apparatus for sequencing loading units in a predetermined order, with which apparatus the loading units can be provided in the correct order for subsequent palleting on pallets or in roll cages.

SUMMARY OF THE INVENTION

This summary introduces selected basic concepts or features of the invention that are further described hereinbelow and is not intended to be limiting of the invention. To solve the aforementioned problems, the invention provides an apparatus for sequencing loading units. The invention also provides a method for sequencing loading units.

By means of the apparatus for sequencing the loading units, the loading units are brought into an order suitable for the palleting of the loading units on a pallet or in a roll cage; in other words, after they have left the inventive apparatus, the loading units are in a suitable order to be fed, for example, to a conveying device arranged downstream. The conveying device arranged downstream then conveys the loading units in the suitable and predetermined correct order, for example, to an automated palleting device. The automated palleting device (not a component of the present invention) then stacks the loading units in the predetermined order on the pallets or in the roll cages in the desired stacking order.

Briefly summarized, an apparatus according to the invention has a sequencing zone with a plurality of belts for receiving the loading units to be sequenced. A feeding device is arranged upstream of the sequencing zone, while a separation device, with intakes for loading units, is disposed downstream of the sequencing zone. A distribution device distributes the loading units onto the belts, and a relocation device conveys separated loading units in a direction towards a conveying device arranged downstream of the relocation device. The distribution device or the relocation device, preferably each, has a transverse pusher for pushing the loading units transversely to the belts and the intakes.

BRIEF DESCRIPTION OF THE DRAWING

The invention is explained in more detail below by reference to the drawings. In the figures.

DISCLOSURE OF THE SPECIFICATION

Figure 1:
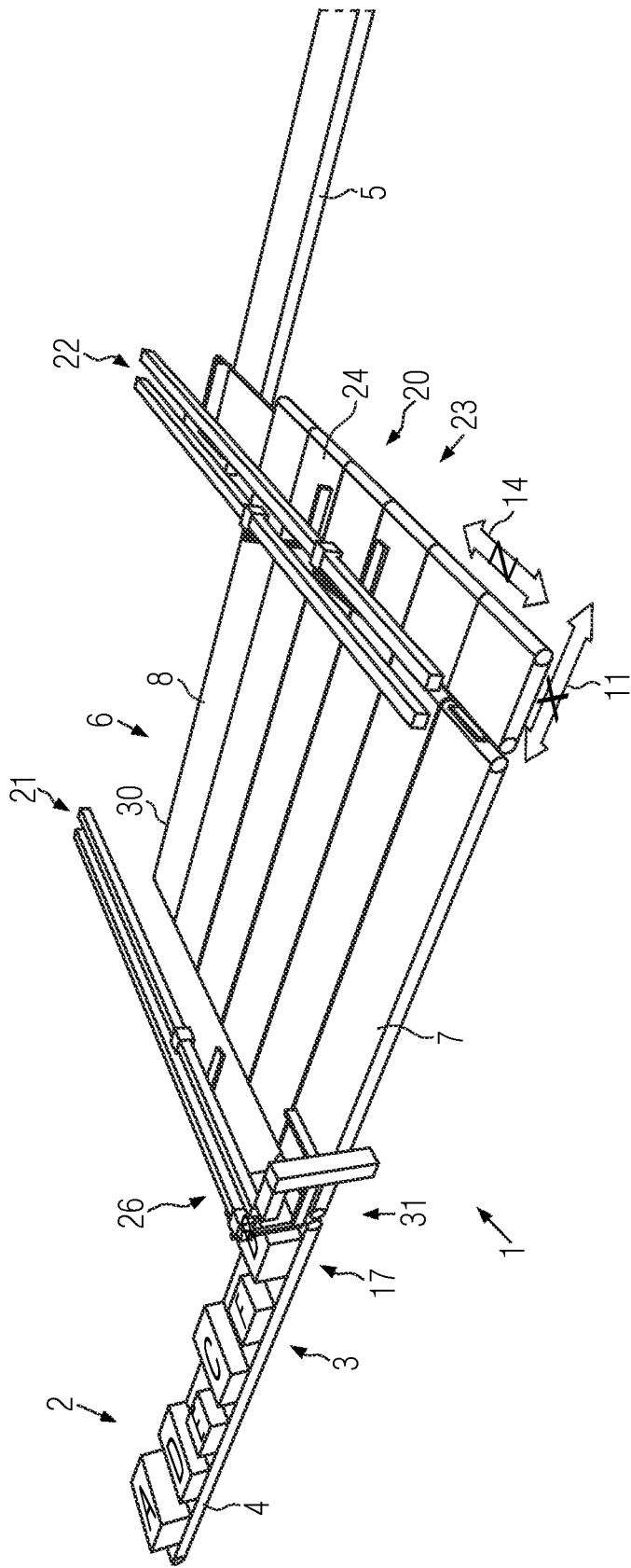
FIG. 1 shows a perspective representation of an apparatus for sequencing loading units in an embodiment according to the present invention.

According to the present invention, provision is made for an apparatus for sequencing loading units in a predetermined order, having a sequencing zone with a plurality of belts for receiving loading units to be sequenced, and a feeding device for supplied loading units which feeding device is arranged upstream of the sequencing zone. Also included is a separation device with intakes for loading units, which separation device is arranged downstream of the sequencing zone. A distribution device is included for distributing the supplied loading units onto the belts. A relocation device conveys the separated loading units in the direction toward a conveying device arranged downstream, wherein the distribution device and/or the relocation device is configured as a transverse pusher which pushes the loading units transversely to the belts or intakes.

The apparatus according to the invention has a sequencing zone in which a plurality of belts for receiving loading units to be sequenced are provided. The belts are also referred to as "accumulation belts," because several loading units can be arranged from the feeding device one behind the other and onto an individual belt (when viewed in the direction towards the conveying device arranged downstream). The loading units are then conveyed to the conveying device arranged downstream. The feeding device arranged upstream of the sequencing zone may be a feeding belt on which the loading units depalleted by a device for depalleting the loading units from a pallet or the like are conveyed in the direction towards the device for sequencing. The loading units conveyed by the feeding device may be conveyed on the latter in random order, it therefore being possible for the loading units to be in an order which has not be sorted in terms of size or weight on the feeding device, for example, the feeding belt.

By means of the apparatus for sequencing the loading units according to the invention, the predetermined order of the loading units is produced—this being required so that the latter can then be stacked, for example, by means of an automated palleting device on a pallet or in a roll cage (as is desired by the destination branch, or as required as a result of the type of goods, or the weight of the loading units). The apparatus for sequencing the loading units also has a device for separating the loading units arranged downstream of the sequencing zone. The separation device has intakes for the loading units which may be, for example, separation belts, which take the loading units from the belts of the sequencing zone and convey them to a relocation device arranged downstream of the sequencing zone. Alternatively, the intakes provide loading units to a relocation device arranged downstream of the sequencing zone for conveying by the latter.

The apparatus for sequencing the loading units according to the invention also has a distribution device for distributing the supplied loading units onto the belts of the sequencing zone. The relocation device already mentioned above conveys the separated loading units toward a conveying device arranged downstream. The conveying device may be, for example, be the automated palleting device already mentioned above, which then provides the loading units on the pallets or in roll cages in stack form in the intended order.

The invention provides here for the distribution device to be configured as a transverse pusher which can push the loading units transversely to the belts of the sequencing zone. The invention also provides for the relocation device to be able to be configured as a transverse pusher which pushes the loading units transversely to the intakes. The relocation device can therefore push the loading units transversely to the intakes, for example, transversely to the separation belts already mentioned above, which take the loading units from the belts of the sequencing zone in the predetermined order. The transverse pusher has the advantage of having a high output density, that is to say of being able to convey a large number of loading units per time unit and of requiring little space for installation compared, for example, to a lifting table or the like.

According to an embodiment of the invention, provision is made for each transverse pusher to have at least two pusher arms. The pusher arms in each pair are pivotable relative to one another, and are movably disposed on corresponding carrying arms arranged above and transversely to the belts or intakes. Each pair of pusher arms is displaceable axially along its respective carrying arm, and can be brought into abutment with the loading units. Through the at least two pusher arms which are pivotable relative to one another, this configuration, with two pusher arms per carrying arm, enables the conveying capacity of the transverse pusher to be doubled compared to a transverse pusher with only one pusher arm. This enables a much higher throughput capacity of the apparatus for sequencing the loading units according to the invention. In this way, for example, it is possible for the apparatus according to the invention to process at least 800 containers or loading units per hour— for example, at least 800 loading units can be provided in the predetermined order every hour, it then being possible for these to be fed to the conveying device arranged downstream.

Such a high throughput capacity is of considerable advantage, in particular, for loading units filled with fruit and vegetable products. Such highly perishable products can quickly be provided in the form of stacked loading units on the branch pallets or in the branch roll cages, and can therefore be transported onward quickly.

That the at least two pusher arms are configured to be pivotable relative to one another means that a first pusher arm which, for example, has pushed a loading unit to a belt spaced apart from the entrance zone of the sequencing zone and has deposited or placed the loading unit on the belt, can then be moved back in the direction towards the entrance zone (the area for transferring the loading units from the feeding belt to the sequencing zone), while the second pusher arm, during this return movement of the first pivoted pusher arm, pushes a loading unit toward a belt of the sequencing zone. Because the returning pusher arm can be pivoted relative to the other pusher arm, that is to say, can be pivoted backwards at an angle, for example, of 45 to 90 degrees (when viewed in a vertical direction of the pusher arm), the pivoted pusher arm, while being moved back, does not collide with the other (unpivoted) pusher arm that is pushing or displacing a loading unit in the direction of a belt of the sequencing zone. The apparatus according to the invention therefore enables one pusher arm to be moved back in the direction towards the entrance zone of the sequencing zone in which a loading unit to be pushed or displaced next is already provided, while the other pusher arm is simultaneously pushing or displacing a loading unit previously taken at the entrance zone (in the direction towards a belt of the sequencing zone).

The pusher arms can be displaced, in the longitudinal direction of the carrying arms, along respective corresponding carrying arms. The carrying arms are arranged above and transversely to the belts or intakes. A configuration therefore is possible in which more than one pusher arm can be displaced on a given carrying arm, as is a configuration in which each pusher arm has a separate carrying arm assigned to it; thus, if there are two pusher arms, two carrying arms are provided along which the pusher arms can be displaced. The pusher arms are therefore also pivotable relative to the carrying arms and can, for example, be hinged on the carrying arm by means of a respective pivot joint, so that the pusher arm can be pivoted on the pivot joint relative to a horizontal direction of the carrying arm.

According to an embodiment of the invention, provision is made for the abovementioned intakes to be configured in the form of separation belts which convey the loading units into the area of reach of the transverse pusher. The separation belts therefore take the respective loading unit from the respective belt of the sequencing zone, and convey the loading unit into the area of reach of the pusher arm of the transverse pusher, which then brings the pusher arm or, for example, a horizontally configured side arm of the pusher arm into abutment on a side surface of the loading unit. The side arm is then held on the side surface of the loading unit while the pusher arm is displaced on the carrying arm; this displacing movement of the pusher arm on the carrying arm causes the loading unit to be conveyed toward a conveying device. The conveying device may be a conveyor belt or a pusher which finally deposits the loading unit on the pallet or in the roll cage, or deposits the loading unit on another loading unit already positioned on the pallet or in the roll cage.

According to an embodiment of the invention, provision is made for the feeding device to be configured as a feeding belt, and for a stop device to be provided between the feeding belt and a belt of the sequencing zone adjacent to the feeding belt, on which loading units conveyed onto the adjacent belt can be brought into abutment such that they remain arranged in abutment thereon as the belt runs. Loading units thus can be brought into releasable engagement with the transverse pusher or its pusher arm. According to an alternative, provision is also made for the loading units to be fed to the stop device, to come into abutment there, and then for the belt on which the loading unit is arranged to be stopped and the loading unit then to be taken by the transverse pusher or the pusher arm and displaced or pushed onto a predetermined belt of the sequencing zone.

According to an embodiment of the invention, in the end region of each belt of the sequencing zone, adjacent to the intake, provision is made for a stop device. Each stop device is displaceable relative to its corresponding belt, such that a loading unit arranged on the belt can be conveyed by the running belt towards the intake when the associated stop device is displaced. The loading unit conveyed by the transverse pusher onto the corresponding belt of the sequencing zone is therefore conveyed in the direction towards the associated stop device by the transporting movement, or conveying movement, of the belt and comes into abutment there. The stop device therefore also then prevents the loading unit from being transported any further by the running belt until the stop device has been displaced relative to the belt; for example, until the stop device has been displaced in a downward direction from the horizontal plane of the belt so that the conveying movement of the belt moves the loading unit onto the intake. The corresponding running belt, for example, moves the loading unit onto the adjacent separation belt, by which the loading unit is taken and is conveyed into the area of reach of the transverse pusher of the relocation device. The loading unit is then conveyed by the transverse pusher to the conveying device arranged downstream in the form, for example, of the already mentioned palleting device and deposited by the latter on the pallet or in the roll cage.

According to an embodiment of the invention, provision is made for the pusher arm to be configured to be pivotable relative to the carrying arm, and to be able to be brought into abutment on the loading unit by means of the pivoting movement. The pusher arm also is displaceable along the carrying arm in the pivoted position relative to the other pusher arm. This means that both pusher arms can be displaced along the single carrying arm, or along a pair of carrying arms, past one another. In this way, with the simultaneous movement of the two pusher arms, the conveying rate of the apparatus according to the invention is increased because one of the two pusher arms is always displacing a loading unit relative to the belts of the sequencing zone, or displacing a loading unit relative to the intakes or separation belts—while the other pusher arm of the pair is moving back in the direction towards the inlet zone of the sequencing zone or moving back in the direction towards the intake or the separation belt in which or on which the next loading unit is to be taken by the pusher arm.

According to an embodiment of the invention, provision is also made for the conveying speed of the respective separation belt or of the respective intake to be greater than the conveying speed of the corresponding belt of the sequencing zone and, after the loading unit has been gathered by the separation belt or the intake, for the stop device to be or to become displaced into an abutment position relative to the belt of the sequencing zone (such that a loading unit conveyed by the belt in the direction towards the stop device comes into abutment thereon). After the loading unit has been received by the intake or by the separation belt, the stop device, which had been displaced, for example lowered, in order to release the respective loading unit relative to the intake or to the separation belt, is immediately moved back into the stop position. For example, the stop device may be extended relative to the belt of the sequencing zone, so that the loading unit conveyed on the belt of the sequencing zone immediately comes back into abutment on the stop device. Consequently, a loading unit already located on the belt of the sequencing zone which is following the loading unit just transferred from the belt of the sequencing zone onto the separation belt comes into abutment on the stop device. The transport by the separation belt of the loading unit just transferred causes a gap to be created between the loading unit just transferred and the previously adjacent loading unit still located on the belt of the sequencing zone. While this gap exists, the stop device is moved back into the stop position and the stop device is disposed in the stop position before the next loading unit comes into abutment on it.

According to an embodiment of the invention, provision is made for the belts and the intakes or separation belts to be configured as modular chains. As such, they may be provided with a chamfered border region transverse to the conveying direction of the belts. This chamfered border region ensures that the loading units conveyed by the pusher arm transversely to the conveying direction of the modular chains, with the respective border region of the bottom of the loading unit assigned to the modular chain, do not collide with the modular chain. Instead, they can be conveyed by the pusher arm onto the conveyor surface or conveyor surfaces of the modular chains without any risk of collision.

The invention also provides a method for sequencing loading units in a predetermined order by means of a sequencing zone with a plurality of belts for receiving loading units to be sequenced and a feeding device arranged upstream of the sequencing zone for supplied loading units and a separation device arranged downstream of the sequencing zone with intakes for loading units, and a distribution device distributing the supplied loading units onto the belts and a relocation device conveying the separated loading units in the direction towards a conveying device, wherein, according to the method, the loading units are displaced relative to the belts of the sequencing zone by means of a transverse pusher. This means that the loading units provided by means of the feeding device can be taken by the sequencing zone by means of a transverse pusher which is provided in the entrance area or in the entrance zone of the sequencing zone and the loading units are displaced by the transverse pusher relative to the belts of the sequencing zone. The transverse pusher is able to displace the respective loading unit to a predetermined belt of the sequencing zone here, wherein the respective belt, for example, is established or predetermined by a control device, that is to say on the basis of an order, by which the loading units are then sequenced or sorted into the predetermined order, including, for example, as a function of the state of occupancy of the belts, so that they are then provided at the exit of the sequencing zone in the order that has been predetermined for the subsequent palleting of the loading units.

According to an embodiment of the method according to the invention, provision is also made for the loading units to be displaced relative to the intakes of the separation device arranged downstream by means of a transverse pusher. The intakes of the separation device arranged downstream may, for example, be separation belts, wherein in each case one separation belt is assigned to a respective belt of the sequencing zone and the separation belt then takes a loading unit from the belt of the sequencing zone. The loading unit taken on the separation belt in this way is then displaced by means of the transverse pusher, e.g., in the direction towards a conveying device arranged downstream, which may, for example, be an automated device for palleting the sequenced loading units, which can then deposit the loading units in the form of stacks on a pallet or in a roll cage.

According to an embodiment of the method according to the invention, provision is also made for the transverse pusher to have two first and second pusher arms which are pivotable relative to one another and for both pusher arms to be displaced on at least one carrying arm transversely to the conveying direction of the belts of the sequencing zone, wherein one of the pusher arms conveys a loading unit in the direction towards the respective belt of the sequencing zone, while the other pusher arm is moved in a position pivoted with respect to the carrying arm in the direction towards a belt adjacent to the feeding device. Accordingly, one of the pusher arms displaces a respective loading unit in the direction towards the predetermined belt of the sequencing zone and the other pusher arm is already moving back in the direction towards the position for taking loading units, wherein the position for taking loading units may be provided in the region of a belt adjacent to the feeding device.

Attention is invited to FIG. 1 of the drawings, showing a perspective representation of an apparatus 1 for sequencing loading units 2 which, in FIG. 1, are arranged on a feeding device 3 in the form of a feeding belt 4. As is immediately apparent, the loading units 2 have varied sizes or different dimensions and, for clarification of the loading units, have been identified by the different letters "A", "B", "C", "D", "E", "F". As can also be seen from FIG. 1, the loading units 2 have not been sorted into alphabetical order, but, for subsequent further processing, have to be sorted into a specific order (here, into alphabetical order symbolically chosen for the purposes of explaining the representation). Loading units move to an automated palleting device which is not described in any more detail, as can be seen from FIG. 23, which shows the loading units 2 arranged in sorted form on a conveying device 5 which is able to convey the loading units 2, for example, to the automated palleting device. The automated palleting device then stacks the loading units 2 in the form of stacks on pallets or in roll cages (which are not described in any further detail and with which the loading units 2 can then be transported to a branch location or retail outlet). The loading units 2 may be containers or receptacles for holding fruit and vegetable products, but they may also contain other fresh produce, such as, for example, meat or the like, or equally frozen goods, or other products.

Because of the high sequencing output, the apparatus 1 for sequencing loading units 2 in a predetermined order is particularly suitable for sequencing loading units in the form of the containers described above, which need to be processed within a brief time owing to the perishability of the goods specified. The apparatus 1 according to the invention is able, for example, to process at least 800 containers per hour.

Figure 10:
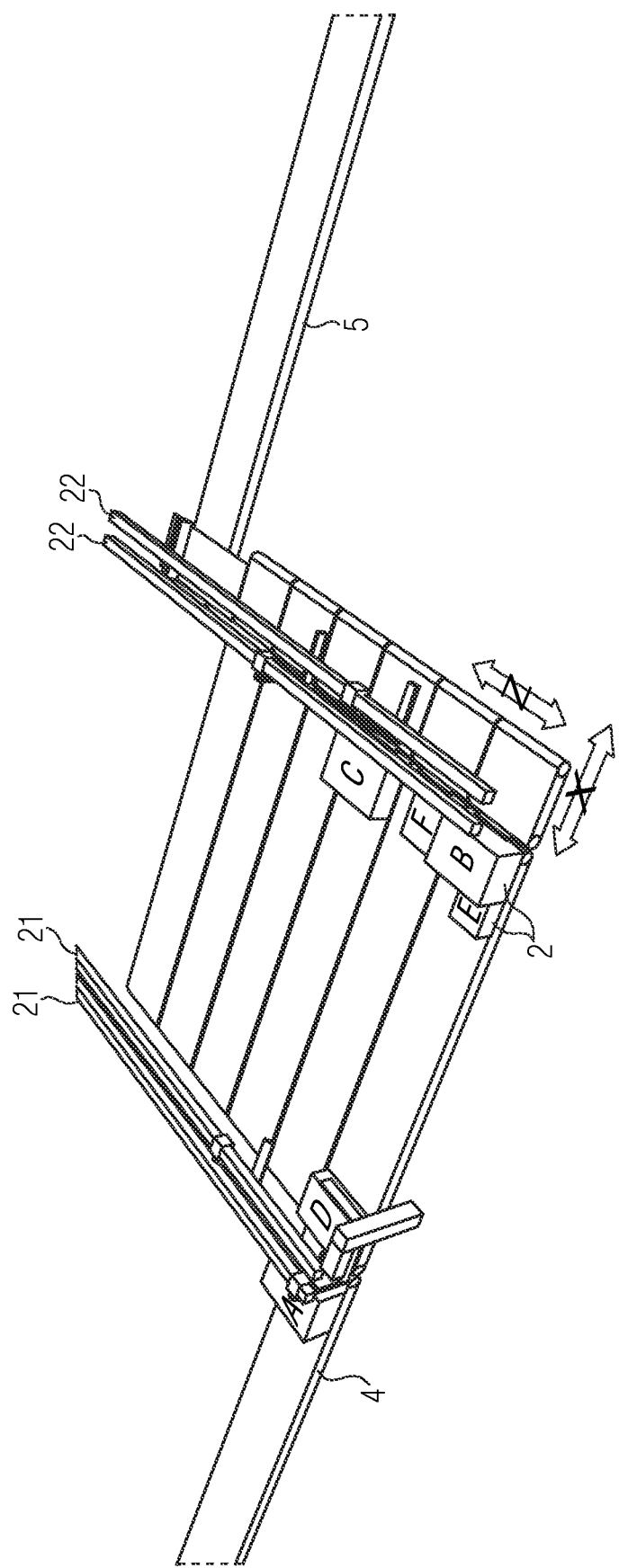
FIG. 10 is a perspective representation in which the apparatus according to the invention is in a next step of the sequencing process.

The apparatus according to the invention also has a sequencing zone 6 which, in the embodiment of the apparatus 1 shown, has six belts 7 which are arranged parallel to one another. The belts 7 may also be referred to as accumulation belts because more than one loading unit 2 can also be arranged on the belts 7. For example, FIG. 10 shows the first belt 7 with two loading units 2 arranged thereon. The belts 7 may be configured in the form of modular belts 8 which, for example, may be 4 to 5 millimetres thick or high and are provided, at least in the border region 9 (see FIG. 2), with rounded edges 10.

With the double arrow 11 designated by an X, FIG. 1 of the drawings shows the direction in which the upper tension belt 12 (see FIG. 2) of the modular belt 8 moves and also the direction in which the lower tension belt 13 (see FIG. 2) of the modular belt 8 moves. With the double arrow 14 designated by a Z, FIG. 1 shows the direction in which the first pusher arm 15 (see FIG. 2) and the second pusher arm 16 (see FIG. 2) of the first transverse pusher 17, and also the third pusher arm 18 (see FIG. 20) and the fourth pusher arm 19 (see FIG. 20) of the second transverse pusher 20 (see FIG. 1), are able to move.

Figure 23:
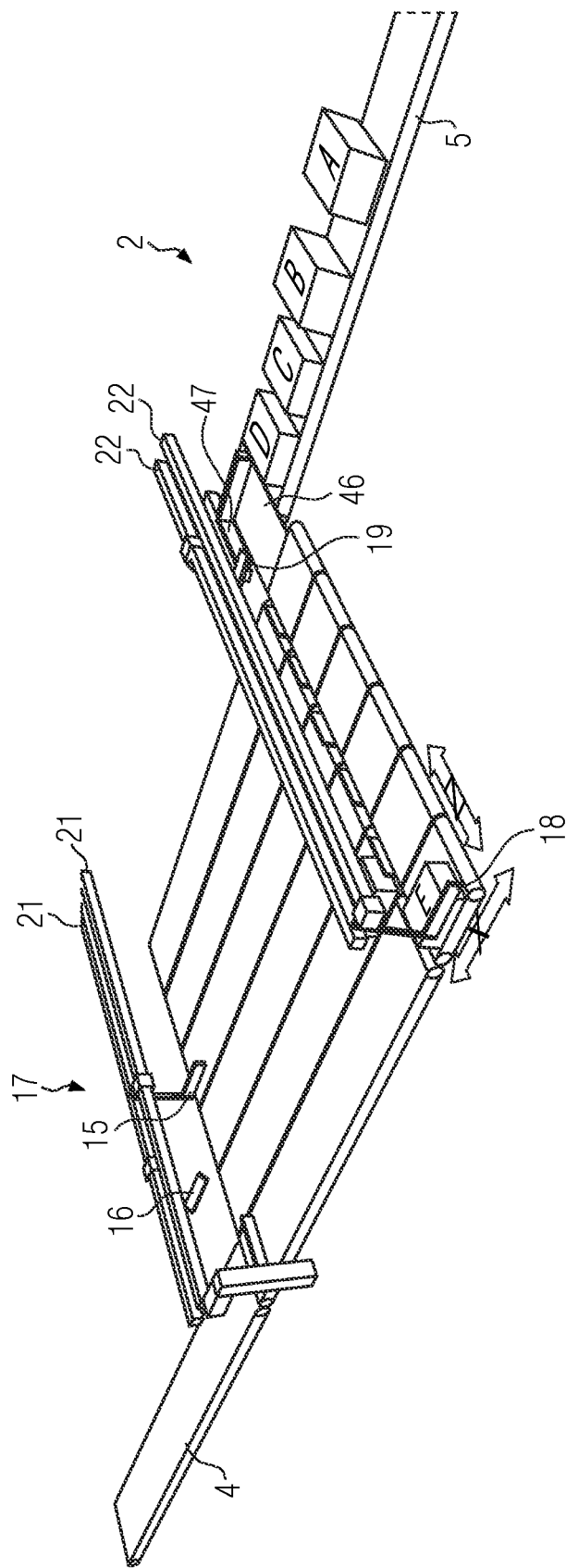
FIG. 23 is a perspective view similar to that of FIG. 22, in which the apparatus according to the invention is in a yet further next step of the sequencing process.

As is immediately apparent, for example, from FIG. 23, the pusher arms 15, 16 of the first transverse pusher 17 can be pushed on two first carrying arms 21 in the longitudinal direction of the carrying arms 21, which corresponds to the direction shown by the double arrow 14. Similarly, the third pusher arm 18 and the fourth pusher arm 19 can be pushed on two second carrying arms 22 in the longitudinal direction thereof, as can be seen, for example, from FIG. 23.

The apparatus 1 also has a separation device 23 seen in FIG. 1 arranged downstream of the sequencing zone 6, with intakes 24 for receiving the loading units 2. The intakes 24 in the embodiment of the apparatus 1 shown are configured as separation belts 25, as can be seen, for example, from FIG. 3.

Figure 2:
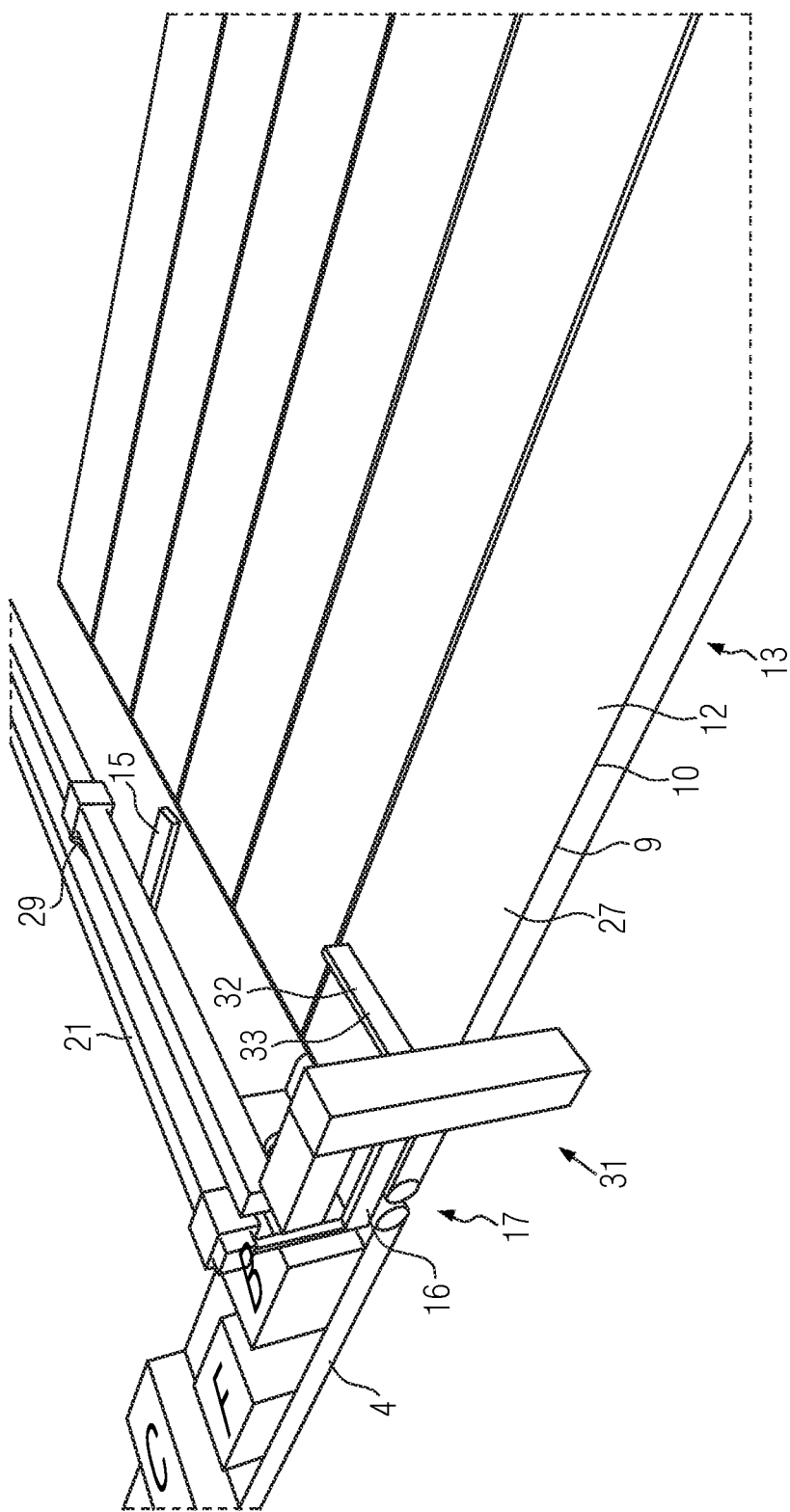
FIG. 2 is an enlarged representation of a section of the apparatus, showing an area for transferring loading units from the feeding device into the sequencing zone.
Figure 5:
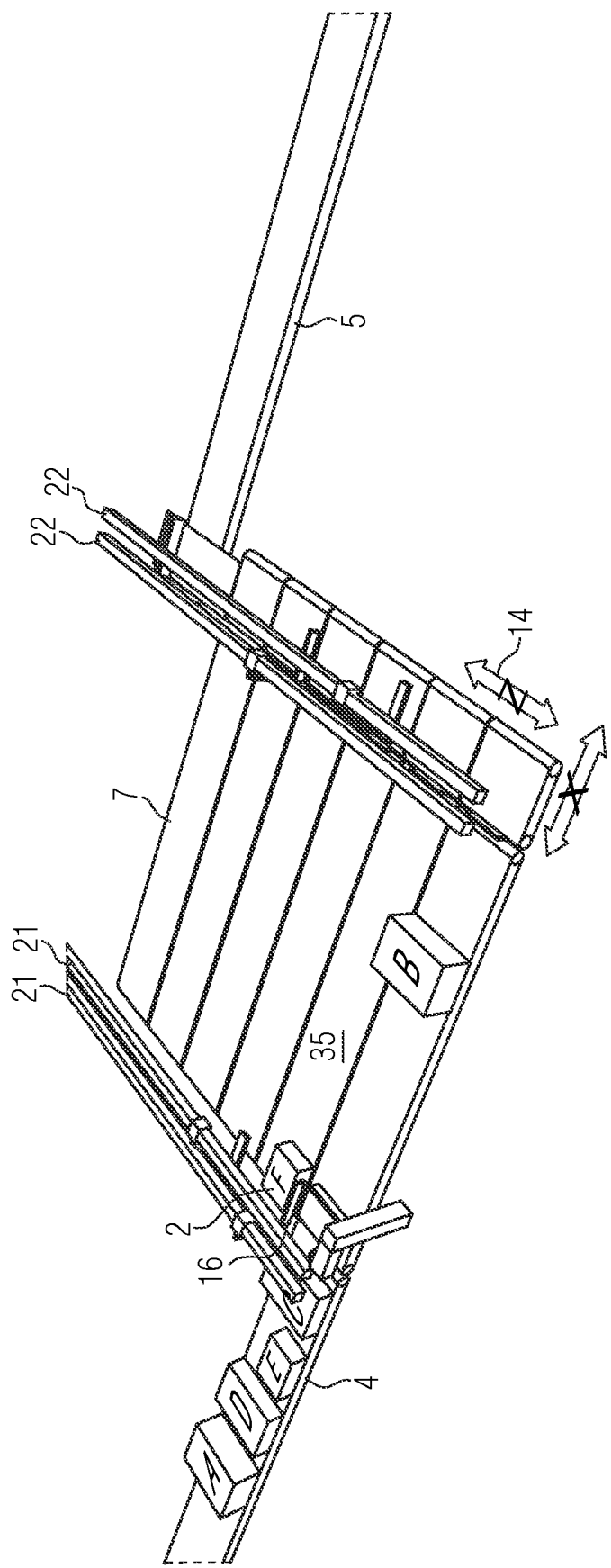
FIG. 5 is a perspective representation of the apparatus in which the second loading unit has already been pushed by the transverse pusher onto a second belt of the sequencing zone.
Figure 6:
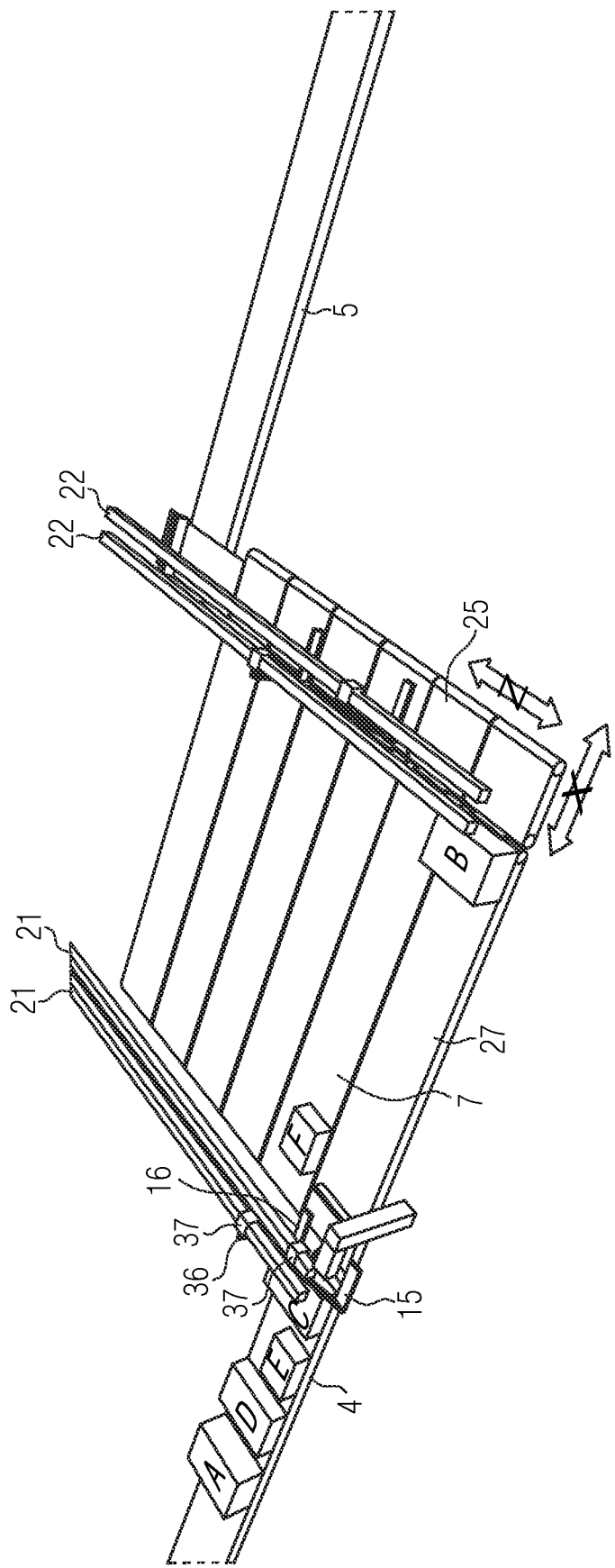
FIG. 6 is a perspective representation in which the first loading unit is arranged on a stop device.

The apparatus 1 also has a distribution device 26 for distributing the supplied loading units 2 onto the several belts 7, which, in the embodiment of the apparatus 1 shown, includes the first transverse pusher 17. The apparatus 1 also has a relocation device 28 (see FIG. 3) for conveying the loading units 2 in the direction towards a conveying device 5 arranged downstream which, in the embodiment of the apparatus 1 shown, includes the second transverse pusher 20. The first transverse pusher 17 has two pusher arms 15, 16 configured to be pivotable relative to one another, as can be seen from FIG. 2. FIG. 2 shows the second pusher arm 16 arranged in a vertical position on the carrying arm 21 and therefore in a position in which the pusher arm 16 can push a loading unit 2. As seen in FIG. 5, for example, loading unit 2 has been designated by the letter "F", and has been pushed by arm 16 transversely to the belts 7, in the direction indicated by the double arrow 14, e.g., onto the belt second 7 adjacent to the first belt 27 (see also FIG. 6). The loading unit 2 is then conveyed by the second belt 7 towards the separation belt 25 that is assigned to the second belt 7 with the loading unit "F" thereon, as seen in FIG. 6.

The distribution device 26 is therefore configured as a first transverse pusher 17 and the relocation device 28 is configured as a second transverse pusher 20. Both transverse pushers 17, 20 have in each case two pusher arms 15, 16 and 18, 19 which are in each case configured to be pivotable relative to one another and are arranged so as to be displaceable transversely to the belts 7 or intakes 24. The first pusher arm 15 and the second pusher arm 16 are arranged so as to be displaceable or pushable on the pair of first carrying arms 21 in the longitudinal direction thereof. The third pusher arm 18 and the fourth pusher arm 19 are arranged so as to be displaceable or pushable on the pair of second carrying arms 22 in the longitudinal direction thereof, as seen in the drawings.

As can also be seen, for example, from FIG. 1, the first carrying arms 21 are arranged above the several belts 7 of the sequencing zone 6 and extend in the direction shown by the double arrow 14. In other words, the carrying arms 21 run transversely to the belts 7; the directions of the belts 7 are indicated by the double arrow 11 in FIG. 1. The second carrying arms 22 are arranged above the intakes 24 and run transversely to the intakes 24, as can likewise be seen, for example, from FIG. 1, but also from all the other drawing figures. As mentioned, in the embodiment of the apparatus 1 according to the invention shown, the intakes 24 are configured as separation belts 25.

Figure 17:
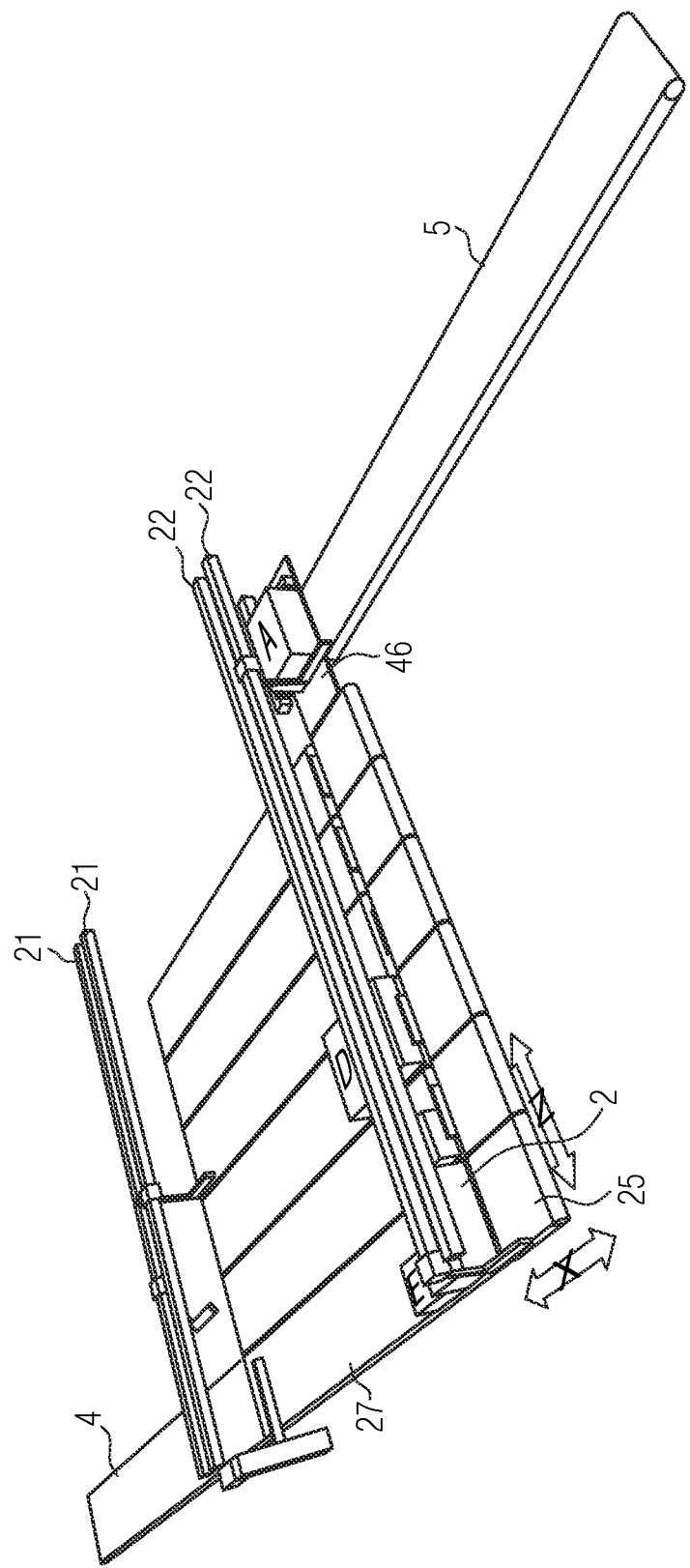
FIG. 17 is a perspective view similar to that of FIG. 16, in which the apparatus according to the invention is in yet another next step of the sequencing process.
Figure 18:
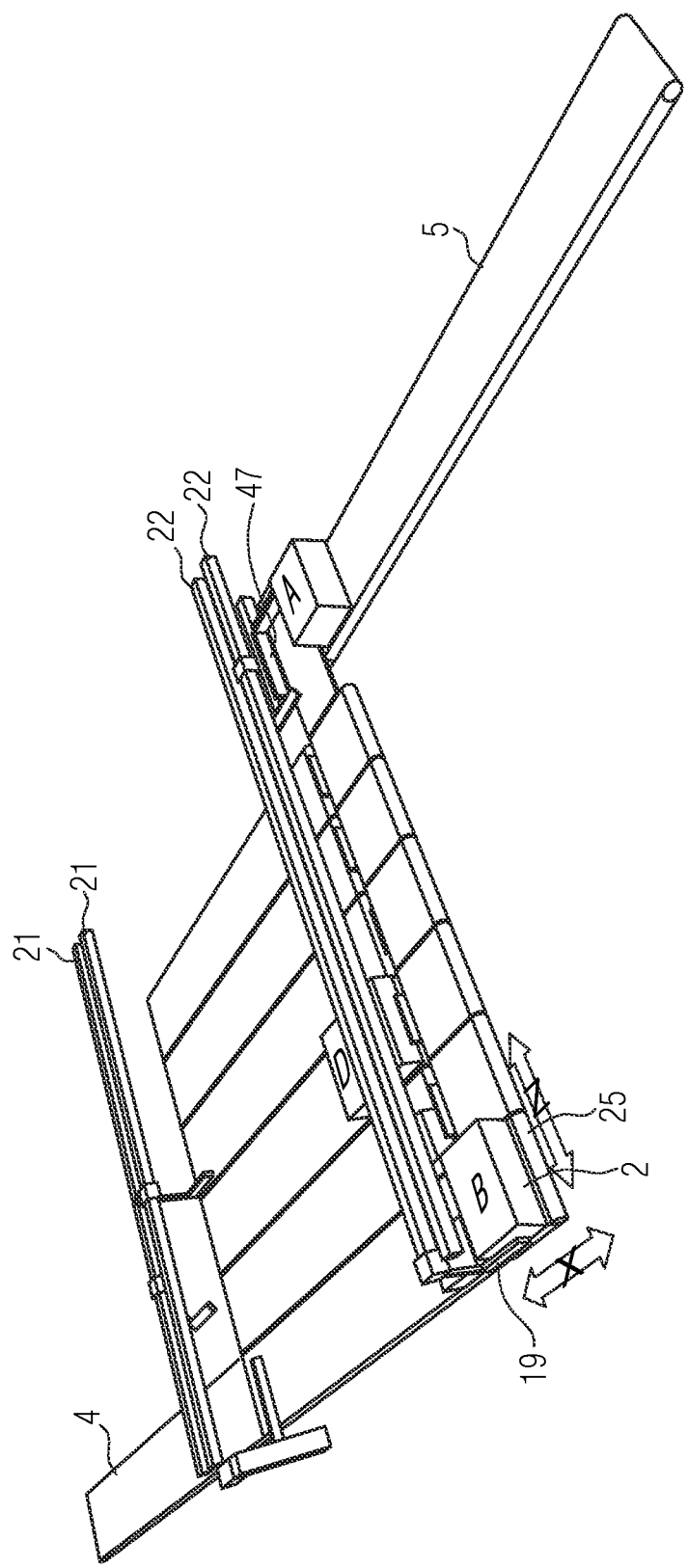
FIG. 18 shows a perspective view similar to that of FIG. 17, in which the apparatus according to the invention is in another next step of the sequencing process.

FIG. 17 and FIG. 18 show that the separation belt 25 assigned to the first belt 27 of the sequencing zone 6 transports the loading unit 2 still waiting on the belt 27 in FIG. 17 in the direction towards the third pusher arm 18; FIG. 18 also shows that the loading unit 2 designated by the letter "B" has been conveyed into the area of reach of the pusher arm 18 of the transverse pusher 20 (see also FIG. 20), and can then be conveyed further by the latter in the direction towards the conveying device 5.

FIG. 2 shows the first pusher arm 15 in a position pivoted relative to the carrying arm 21, that is to say, pivoted in a backwards direction counter to the conveying direction of the pusher arm 15. In the position of the pusher arm 15 pivoted on a pivot joint or tilting joint 29 in this way, the pusher arm 16 can push a loading unit 2 in the conveying direction of the double arrow 14, i.e., transversely to the longitudinal direction of the accumulation belts 7. So, the loading unit 2 is pushable through underneath the pusher arm 15 pivoted in a backwards direction, for example as far as a last or distal belt 30 (FIG. 1) which is spaced in the direction of the double arrow 14 furthest apart from the feeding device 3 or the feeding belt 4. During such a displacing movement of the loading unit 2, for example, onto the distal belt 30 by the second pusher arm 16, the first pusher arm 15 is already able to move back in the direction towards the area 31 for transferring loading units 2 onto the first belt 27 (see FIG. 1).

Figure 3:
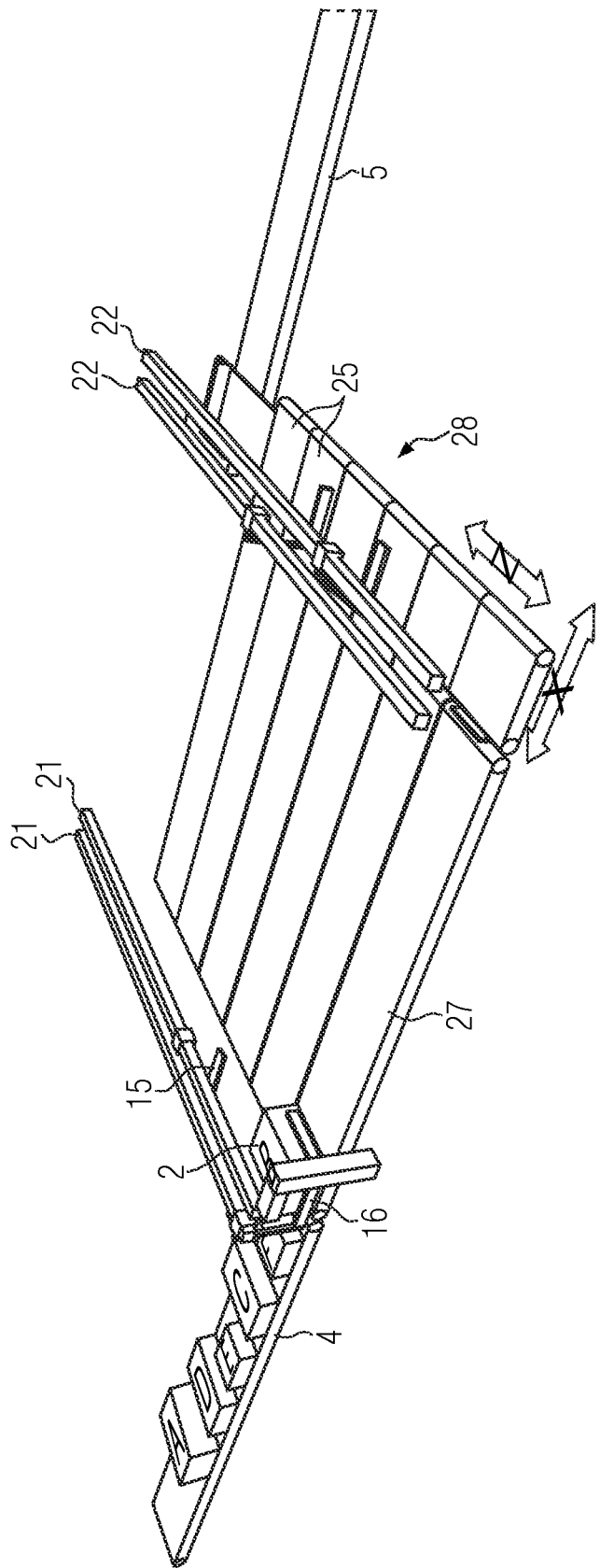
FIG. 3 is a perspective representation similar to that of FIG. 1, showing that a loading unit has already been transferred from the feeding device of the apparatus and into the sequencing zone.
Figure 4:
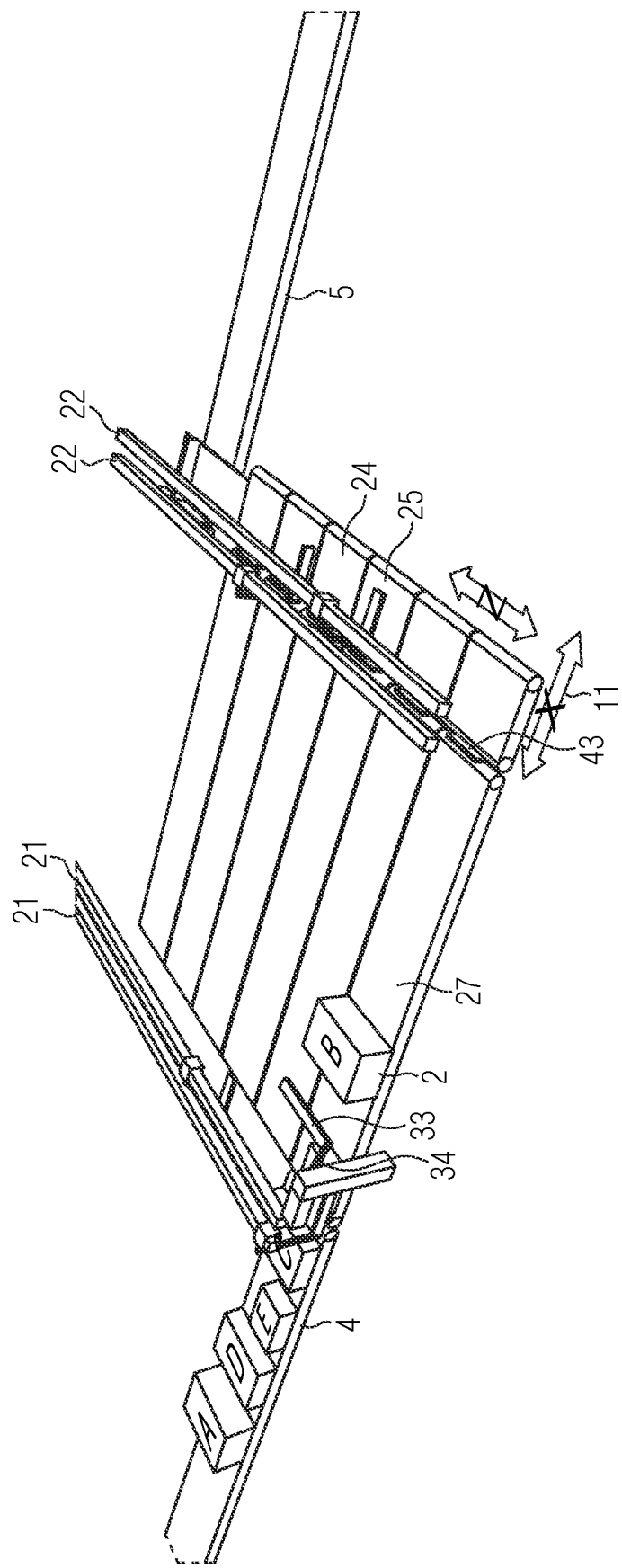
FIG. 4 shows a perspective representation of the apparatus, in which a loading unit is located on a first belt of the sequencing zone and a second loading unit is located in the area for transferring from the feeding device into the sequencing zone.

Arranged in the region of the transfer area 31, between the feeding belt 4 and the first belt 27, that is to say adjacent to the belt 27 of the sequencing zone 6 seen in FIGS. 2-6 and 17, is a stop device 32 in the form of a stopper 33 on which a loading unit 2 transferred by the feeding belt 4 onto the first belt 27 is brought into abutment, as can be seen, for example, from FIG. 2. FIG. 4 of the drawings shows that the stopper 33 has been pivoted in an upward direction on a pivot joint 34 so that the belt 27 is able to convey the loading unit 2 in the direction shown by the double arrow 11, i.e., in the direction of the intakes 24 or of the separation belts 25.

FIG. 5 shows that the loading unit 2 designated by letter "F" is being pushed by the second pusher arm 16 in the direction towards the second belt 35, by which second belt it is then conveyed towards the separation belt 25 seen in FIG. 6.

As can be seen from FIG. 6, the second pusher arm 16 can also be pivoted on a pivot joint 36 relative to the carrying arm 21 and also relative to the first pusher arm 15. The first pusher arm 15 has a guide element 37 with which it is guided on one of the pair of carrying arms 21, and the second pusher arm 16 also has such a guide element for guiding it on the other carrying arm 21. As can be seen, for example, from FIG. 20, the third pusher arm 18 also has a guide element 38 with which it is guided on one of the pair of carrying arms 22, and the fourth pusher arm 19 also has a guide element 38 with which it is guided on the other carrying arm 22.

The fourth pusher arm 19 is arranged so as to be pivotable on a pivot joint 39 relative to the other carrying arm 22, and also relative to the pusher arm 18. The third pusher arm 18 is arranged so to be pivotable on a pivot joint 40 relative to the fourth pusher arm 19 and relative to the one carrying arm 22. Owing to their respective articulated or pivotable arrangement, both pusher arms 18 and 19 can be moved past one another relative to the carrying arms 22 (and also relative to one another) without the pusher arms colliding or one pusher arm colliding with a displacing movement of the loading unit 2, in the direction towards the conveying device 5 taking place underneath it in the direction shown by the double arrow 14.

Figure 20:
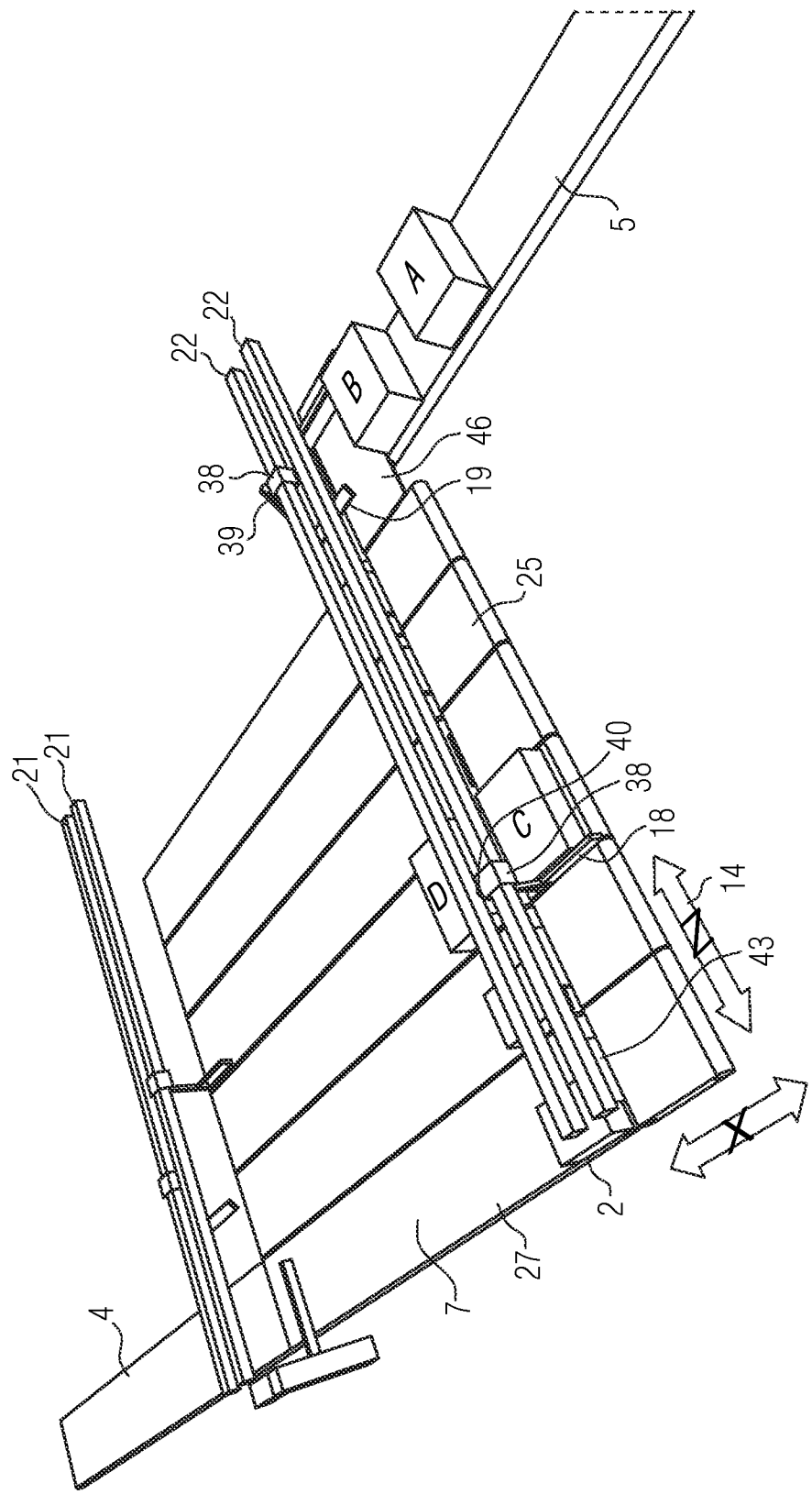
FIG. 20 is a perspective view similar to that of FIG. 19, in which the apparatus according to the invention is in a still further next step of the sequencing process.
Figure 21:
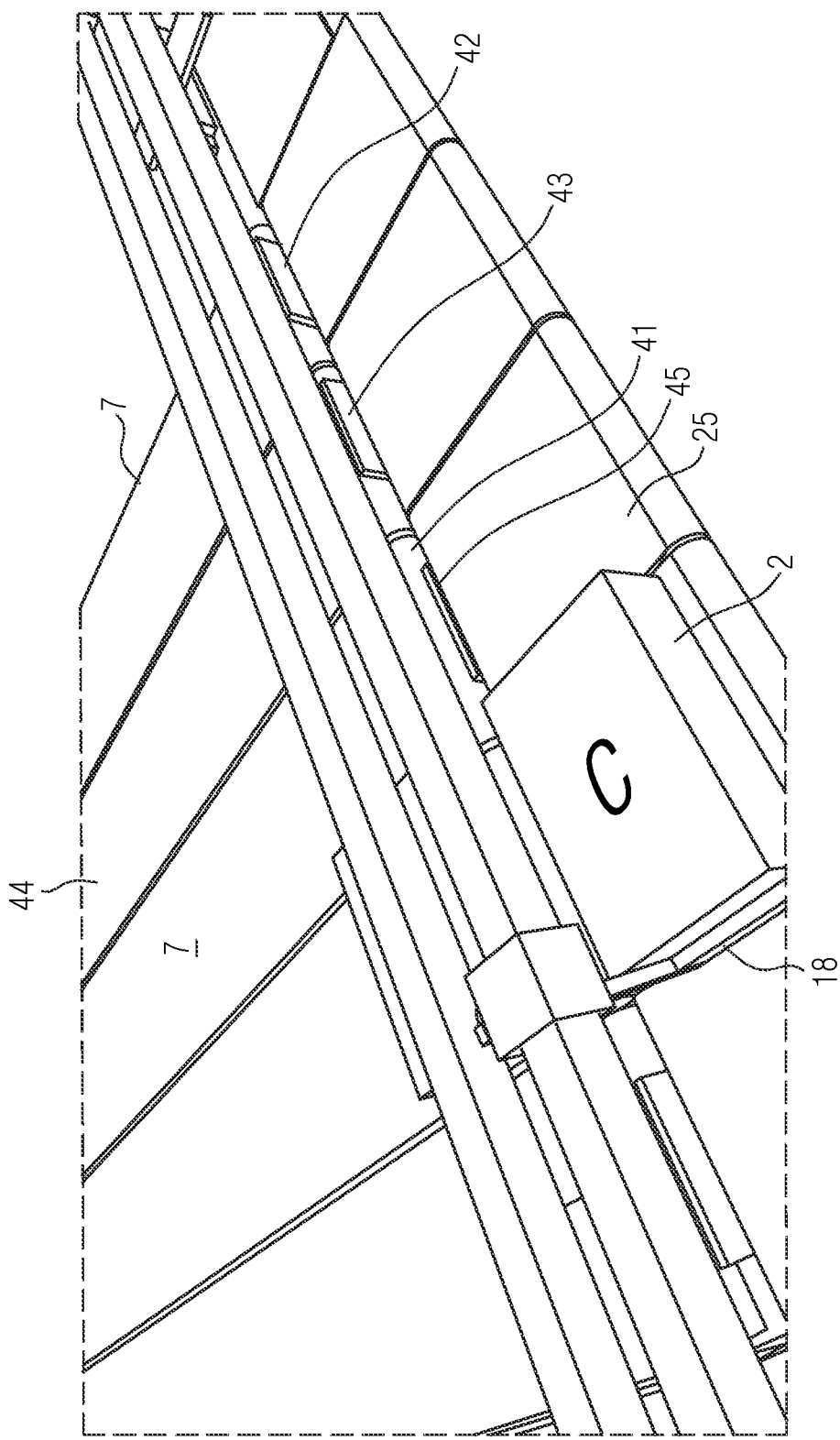
FIG. 21 is an enlarged view of a portion of the apparatus seen in FIG. 20.
Figure 22:
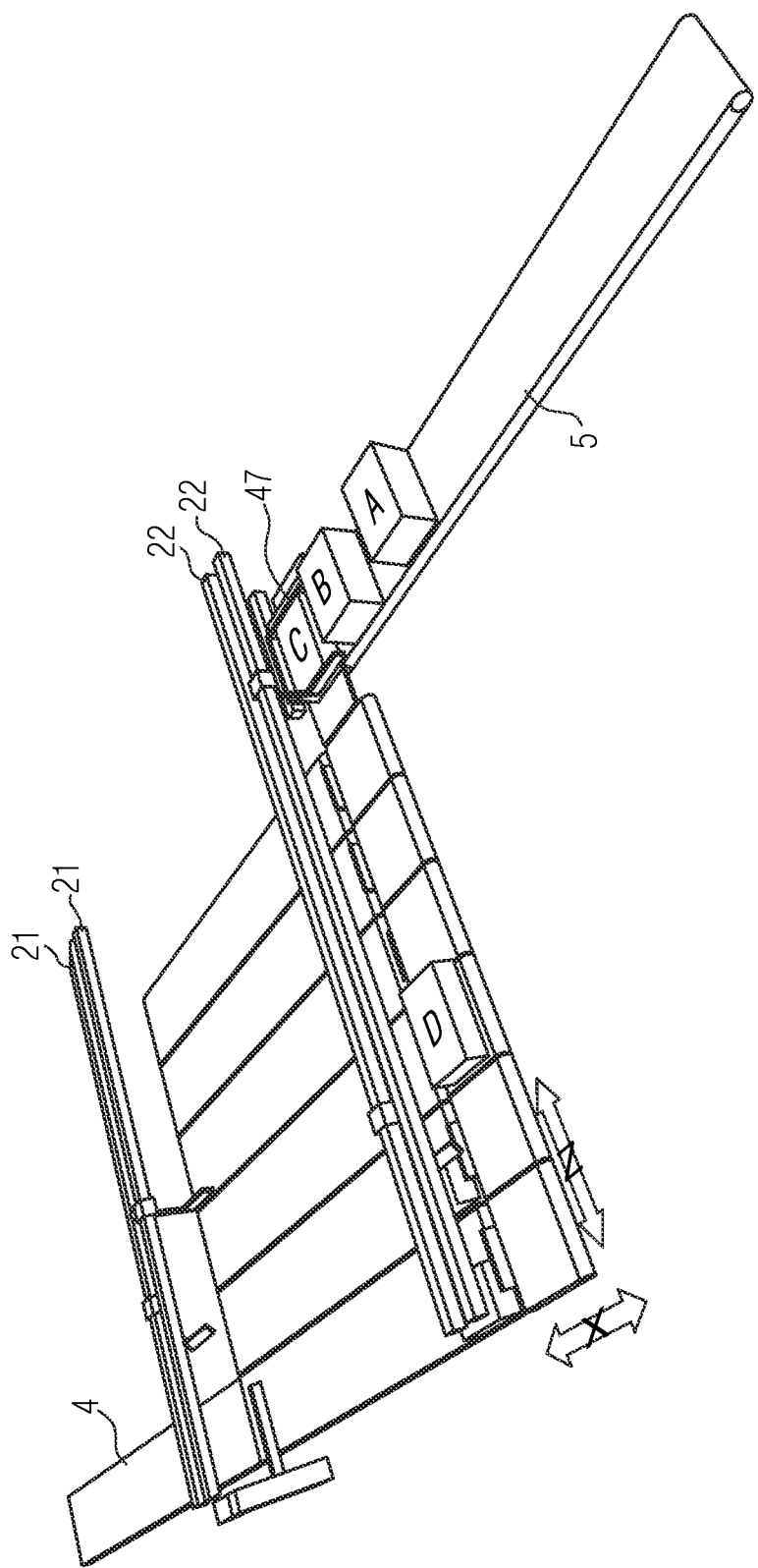
FIG. 22 is a perspective view similar to that of FIG. 20, in which the apparatus according to the invention is in another next step of the sequencing process.

As can be seen, for example, from FIG. 21, a stop device 42 in the form of a stopper 43 is arranged in the end region 41 of each of the several belts 7, on which the respective loading unit 2 comes into abutment when the belt 7 is running. FIG. 20 shows the loading unit 2 arranged on the first belt 27 in abutment on the stopper 43. When the loading unit 2 is to be transferred from a belt 7 onto its corresponding intake 24 or separation belt 25, the stop device 42 is displaced in a downward direction relative to the upper side 44 of the associated belt 7. As can be seen, for example, in FIG. 21, the stopper 45 can be displaced in a downward direction and the revolving conveying movement of the belt 7 conveys the respective loading unit into the area of reach of the separation belt 25; thus the loading unit 2, as can be seen, for example, from the loading unit designated by the letter "C" according to FIG. 21, can then be taken by the respective pusher arm—for example the pusher arm 18 in FIG. 21—and conveyed in the direction towards a push plate 46 (see, for example, FIG. 23). Arranged in the region of the push plate 46 is a pusher 47 which then conveys the containers or loading units 2 onto the conveying device 5.

The pusher arms are each configured to be pivotable relative to their corresponding carrying arm, and can be brought by means of the pivoting movement into abutment on the loading unit 2, for example a side surface of the loading unit 2. The pusher arms can then be axially displaced in their abutment position on the loading unit relative to the carrying arm, as a result of which the loading units can be displaced relative to the respective belt 7 or relative to the respective separation belt 25.

The conveying speed of a respective separation belt 25 is greater than the conveying speed of the accumulation belt 7 of the sequencing zone 6 assigned to that separation belt 25. Thus, the stop device 45 can quickly be extended again relative to the upper side 44 of the respective accumulation belt 7, and the next loading unit 2 can again be brought into abutment thereon before this loading unit is gathered by the separation belt 25.

Figure 7:
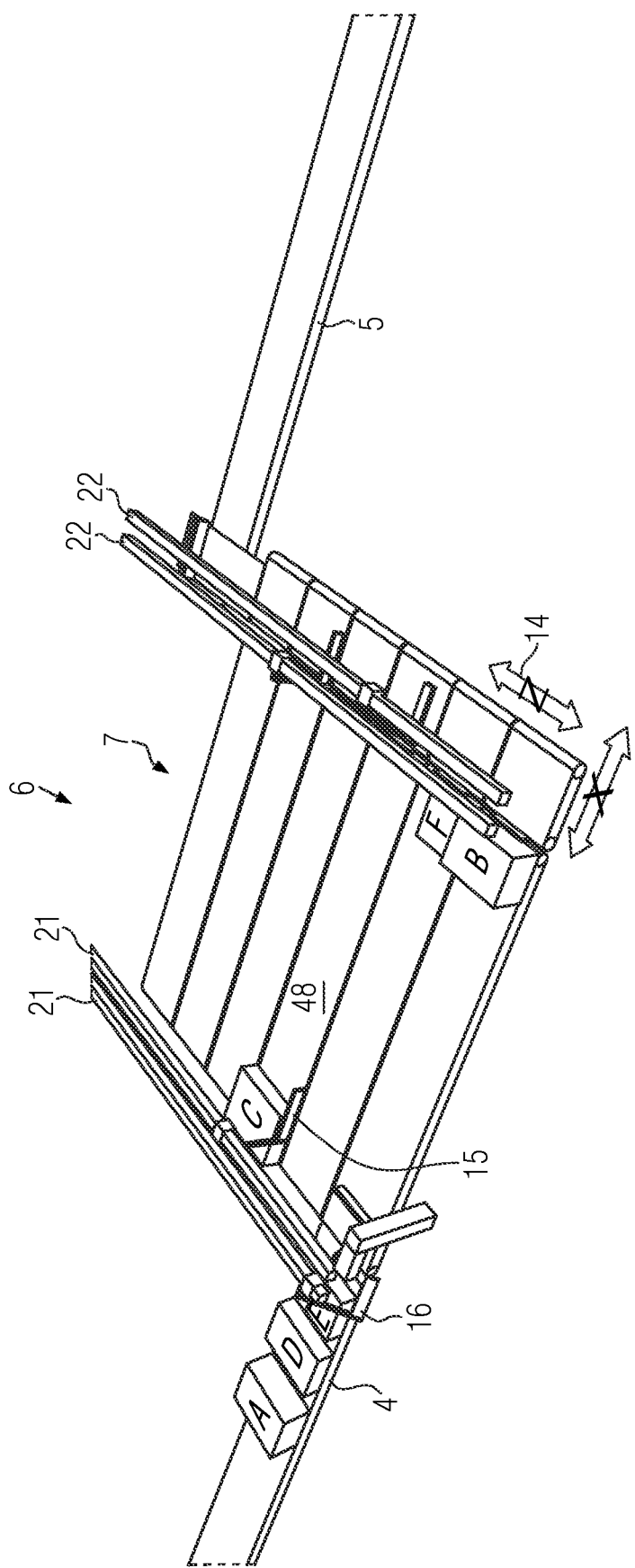
FIG. 7 is a perspective representation in which a third loading unit is arranged on a third belt of the sequencing zone.

FIG. 1 shows an arrangement in which the loading units 2 are not yet arranged in sequential order on the feeding belt 4. FIG. 2 shows an enlarged representation of the area 31 for transferring the loading units 2 from the feeding belt 4 onto the first belt 27 which acts both as a transfer belt and as an accumulation belt. In FIG. 3, a first loading unit 2 has been transferred by the feeding belt 4 into the sequencing zone 6 there, so the loading unit 2 is arranged in the transfer area 31 and is abutting on the stop device 32. FIG. 4 shows a perspective representation illustrating the stop device 32 has pivoted and has freed the path of the loading unit "B" for further conveying on the first belt 27 or the accumulation belt 7 in the direction towards the stop device 43. FIG. 5 shows that a second loading unit "F" has been transferred by the second pusher arm 16 of the first transverse pusher 17 onto the second belt 35 or accumulation belt 7 of the second track with the second belt 35. In FIG. 6, the loading unit "B" is arranged on the stop device 43 and is retained by the latter even if the first belt 27 is still carrying out an advancing movement. FIG. 7 shows that a loading unit "C" has been displaced by the first pusher arm 15 onto the third belt 48 of the sequencing zone 6, and the second pusher arm 16 is in the pivoted position relative to the carrying arm 21 in which the loading unit "C" can also be displaced underneath the second pusher arm 16 in the direction of the double arrow 14 (i.e., transversely the accumulation belts 7).

Figure 8:
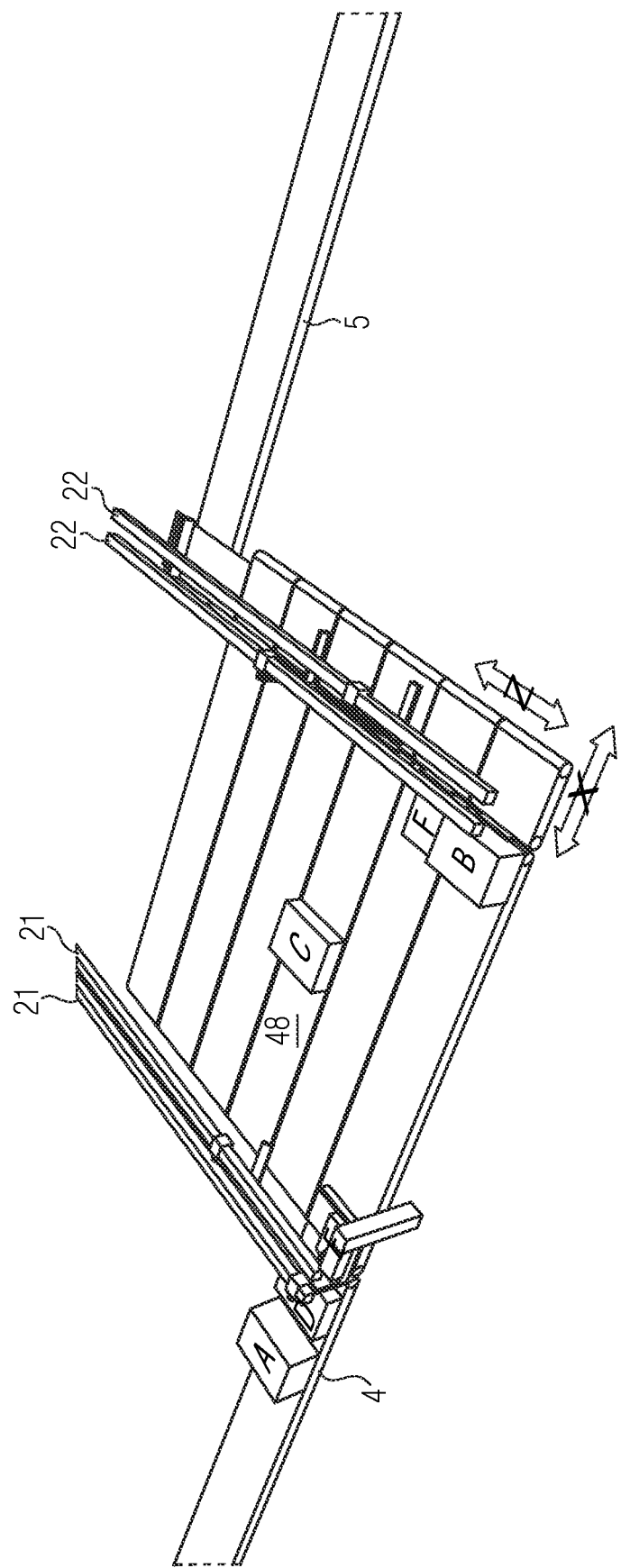
FIG. 8 is a view similar to that of FIG. 7, in which the third loading unit is being conveyed in the direction towards the stop device.
Figure 9:
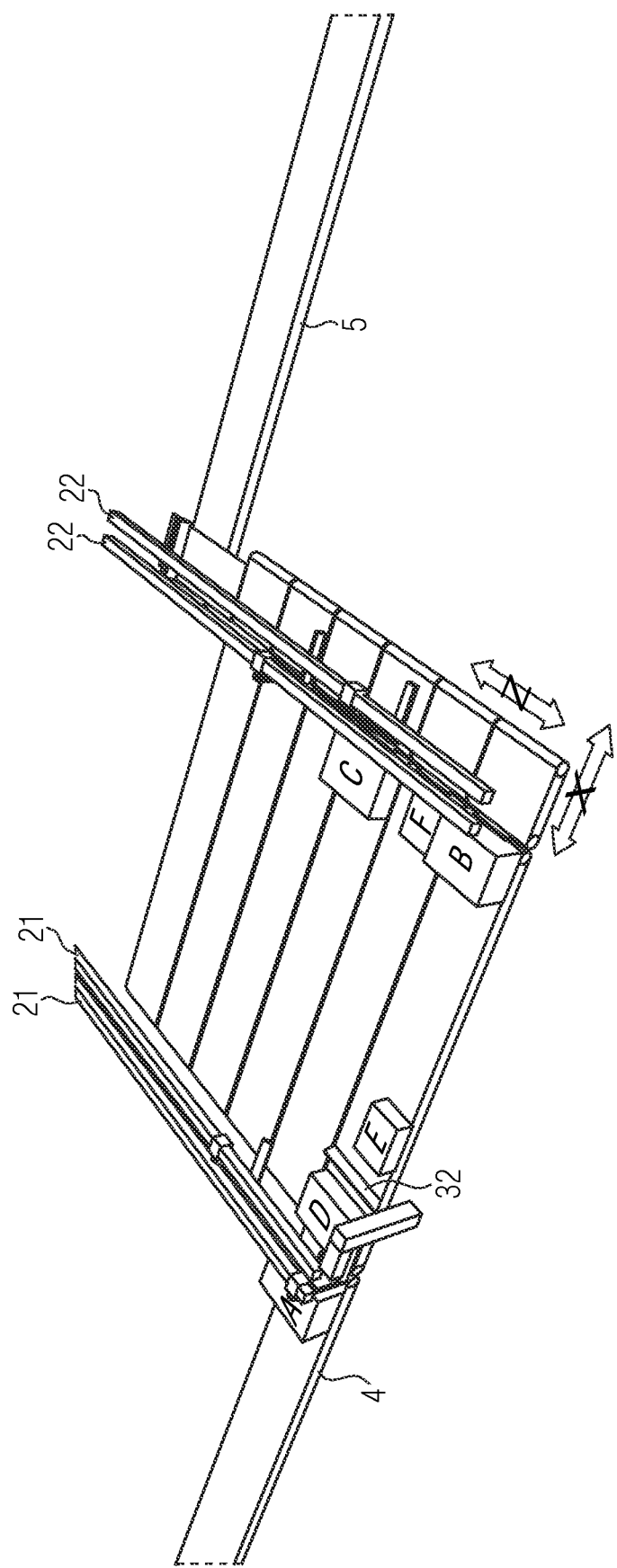
FIG. 9 is a perspective representation of the apparatus according to the invention, illustrating a next step of the sequencing process.
Figure 11:
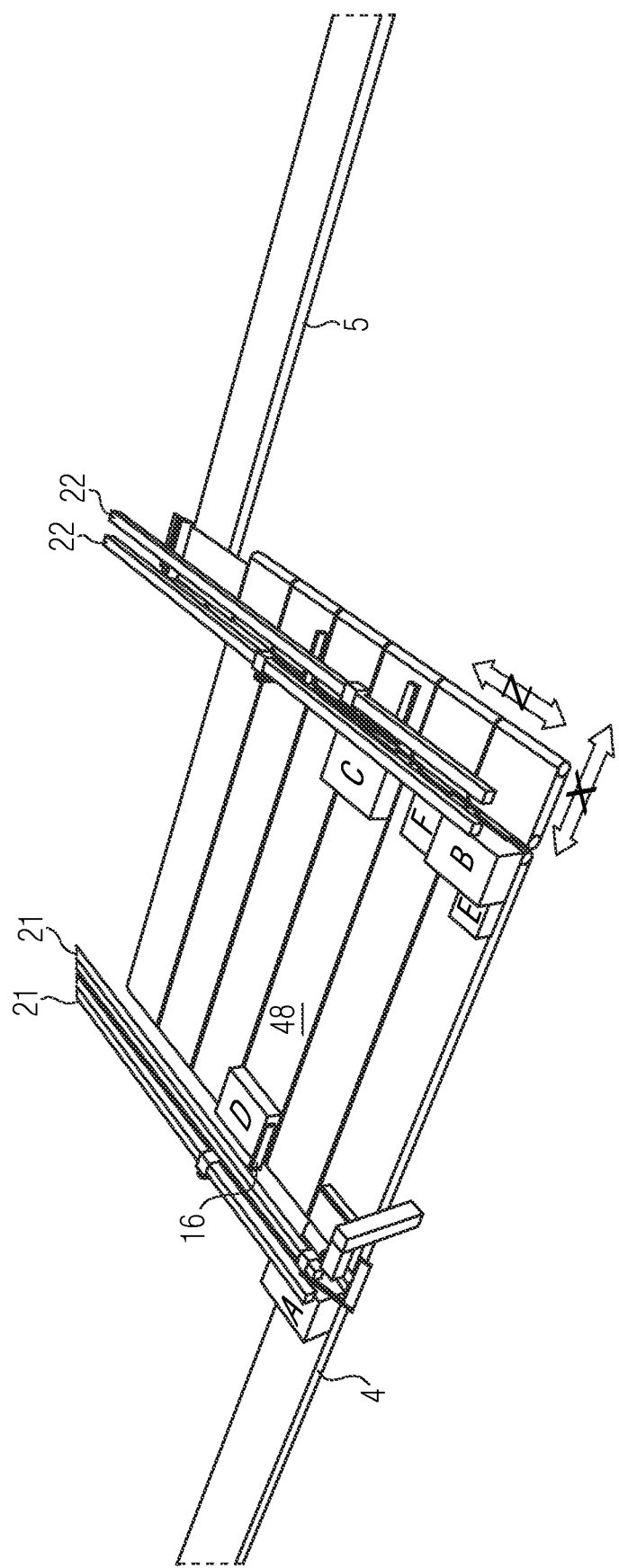
FIG. 11 is a perspective view similar to that of FIG. 10, in which the apparatus according to the invention is in a next step of the sequencing process.
Figure 12:
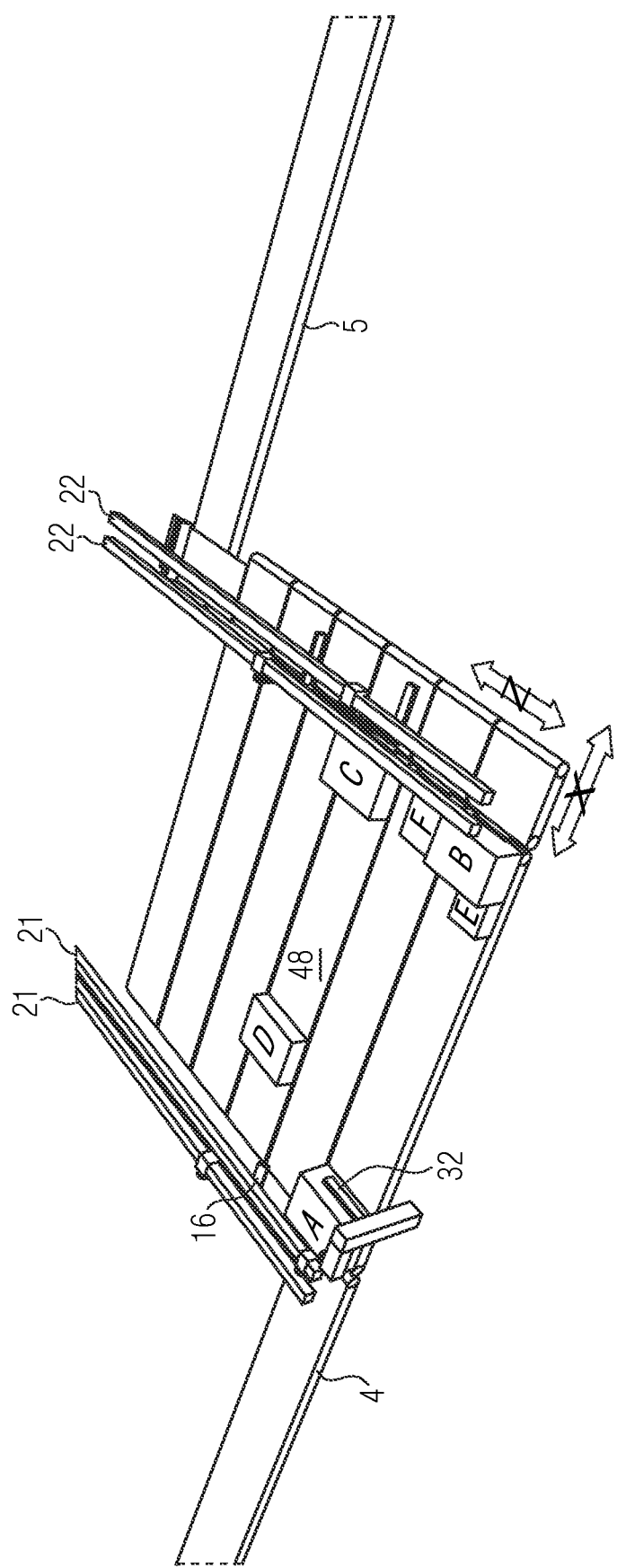
FIG. 12 is a perspective view similar to that of FIG. 11, in which the apparatus according to the invention is in a next step of the sequencing process.
Figure 13:
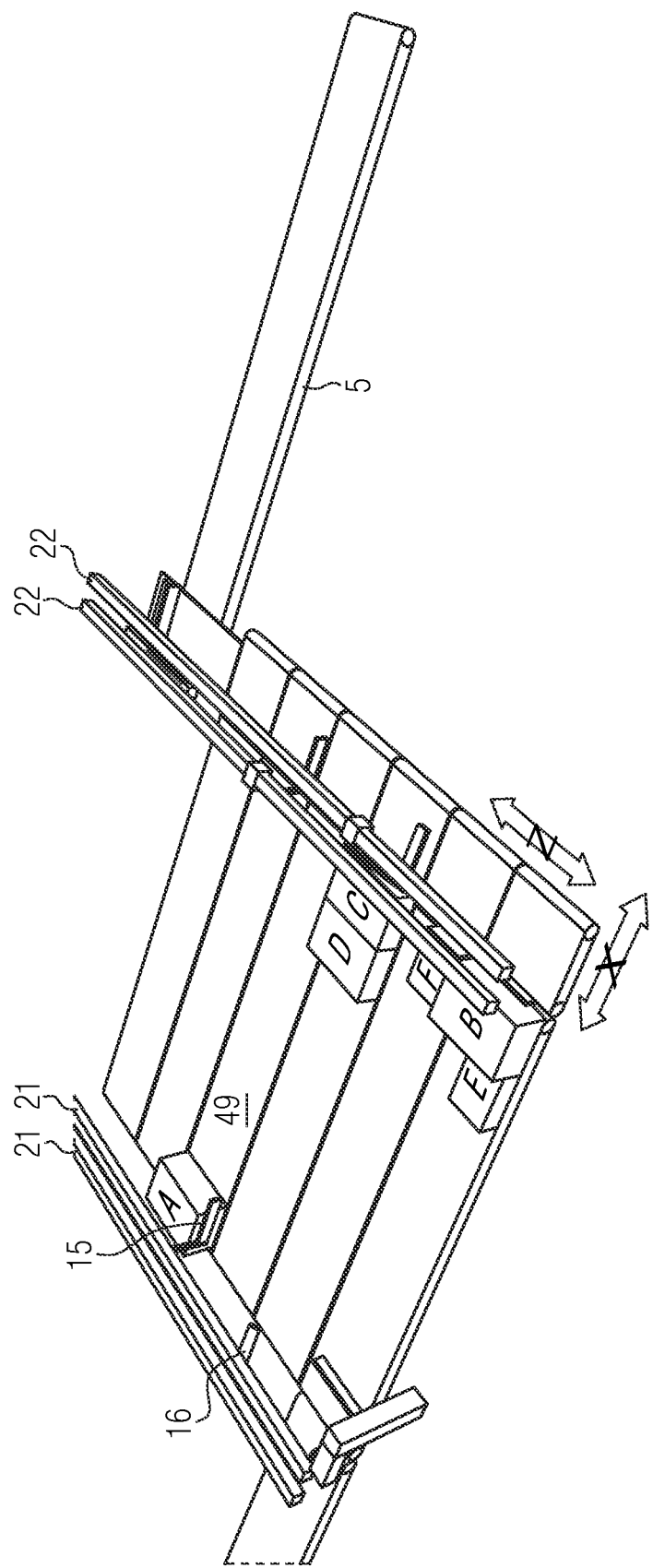
FIG. 13 is a perspective view similar to that of FIG. 12, in which the apparatus according to the invention is in yet another next step of the sequencing process.
Figure 14:
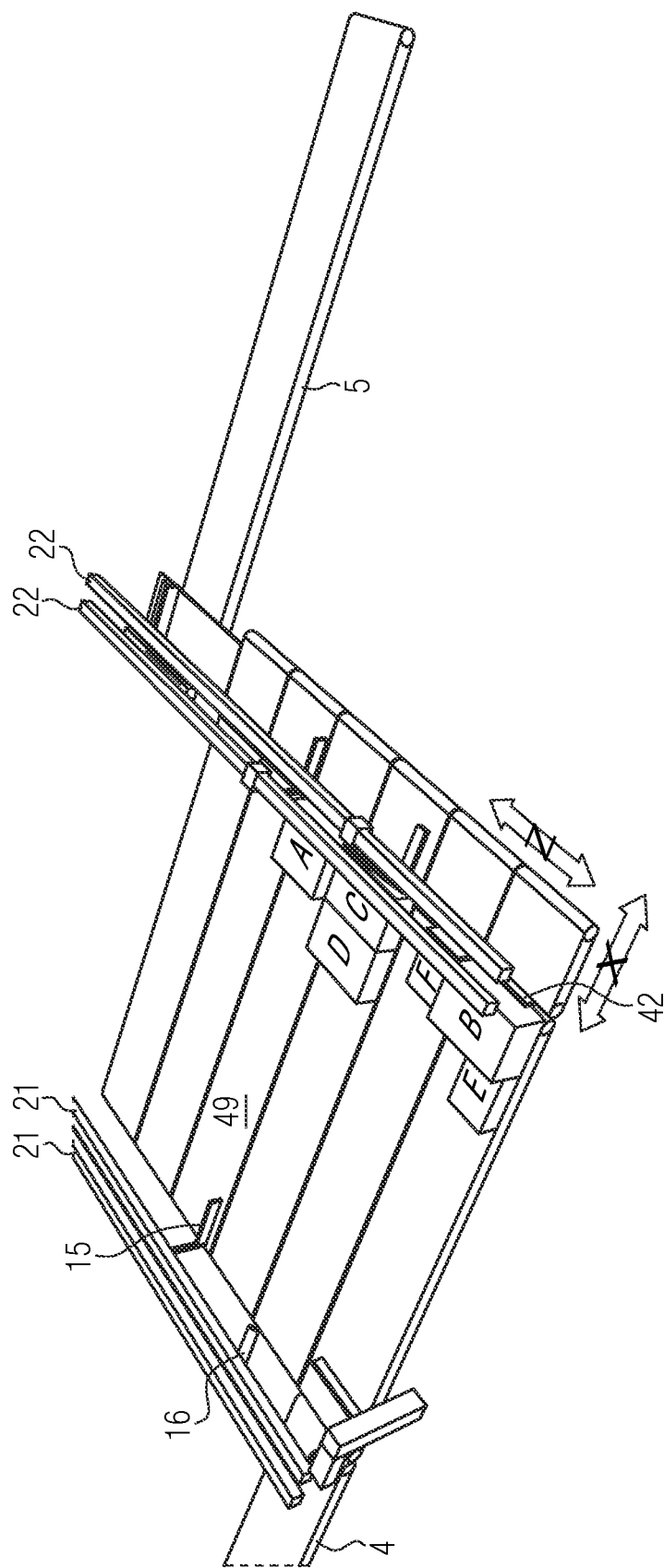
FIG. 14 is a perspective representation in which the sequenced loading units are arranged on the belts of the sequencing zone before they are conveyed by the second transverse pusher to the conveying device arranged downstream.

FIG. 8 shows a representation similar to that of FIG. 7 in which a third loading unit "C" is being displaced towards the stop device 42 on the third belt. In FIG. 9 the loading unit "C" is abutting on the stop device and the loading unit "E" has been released by the stop device 32 for further transport on the first belt 27; the loading unit "D" is arranged shortly before the stop device 32 in order, as can be seen from FIG. 10, to come into abutment there. From there, as can be seen from FIG. 11, loading unit "D" is be taken by the second pusher arm 16 and pushed onto the third belt 48. The third belt 48 then takes the loading unit "D" and conveys it towards the stop device 42; the second pusher arm 16 has been pivoted in a backwards direction relative to the carrying arm 21 so that the loading unit "A" abutting on the stop device 32 in FIG. 12, as also seen from FIG. 13, is pushed by the first pusher arm 15 in the direction towards the fourth belt 49. FIG. 14 shows that the fourth belt 49 has conveyed the loading unit "A" as far as the stop device 42, where it is ready to be taken by the separation belt 25.

Figure 15:
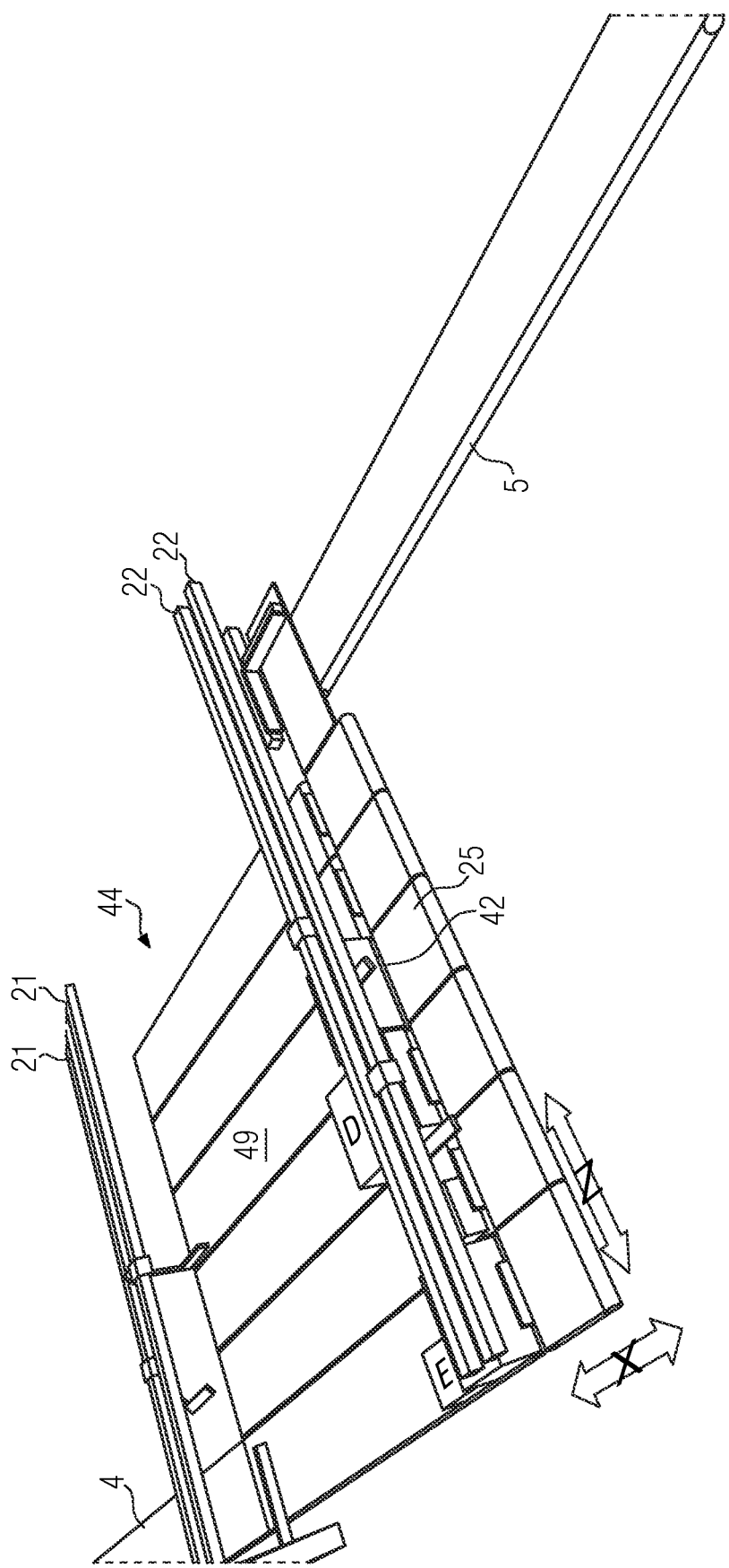
FIG. 15 is a perspective view similar to that of FIG. 14, shown from a different angle.
Figure 16:
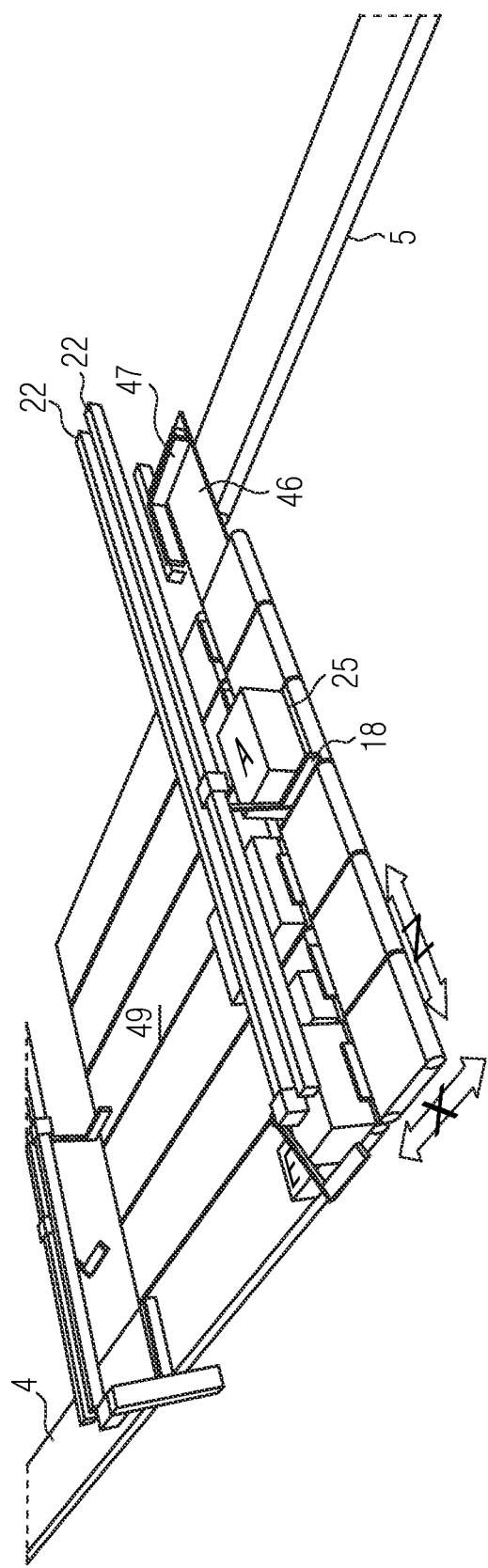
FIG. 16 is a perspective representation showing how a loading unit is conveyed by the second transverse pusher in the direction towards the conveying device arranged downstream.

FIG. 15 shows that the stop device 42 has been lowered relative to the upper side 44 of the accumulation belt 49 so that the conveying movement of the accumulation belt 49 transfers the loading unit "A" onto the separation belt 25, as can be seen from FIG. 16. FIGS. 14-16 also show that the loading units "B", "C", "D", "E" and "F" are still abutting on the stop devices 42 and have not yet been released thereby. When released by the stop device 42, which is assigned to the fourth belt 49, the loading unit "A" was transferred onto the separation belt 25 and can be displaced by the latter into the area of reach of the third pusher arm 18, which can then convey the loading unit "A" by means of a displacing movement on the carrying arm 22 onto the push plate 46, as seen in FIG. 17. The loading unit "A" can then be conveyed by means of the pusher 47 from the push plate 46 onto the conveying device 5, as seen in FIG. 18. FIG. 18 also shows that the next loading unit "B" has been conveyed onto the separation belt 25 and can be taken by the pusher arm 19 in order to be conveyed onto the push plate 46. The loading unit "A" is then located on the conveying device 5, as can be seen from FIG. 20, followed by the loading unit "B"—both loading units therefore being arranged in the predetermined order.

Figure 19:
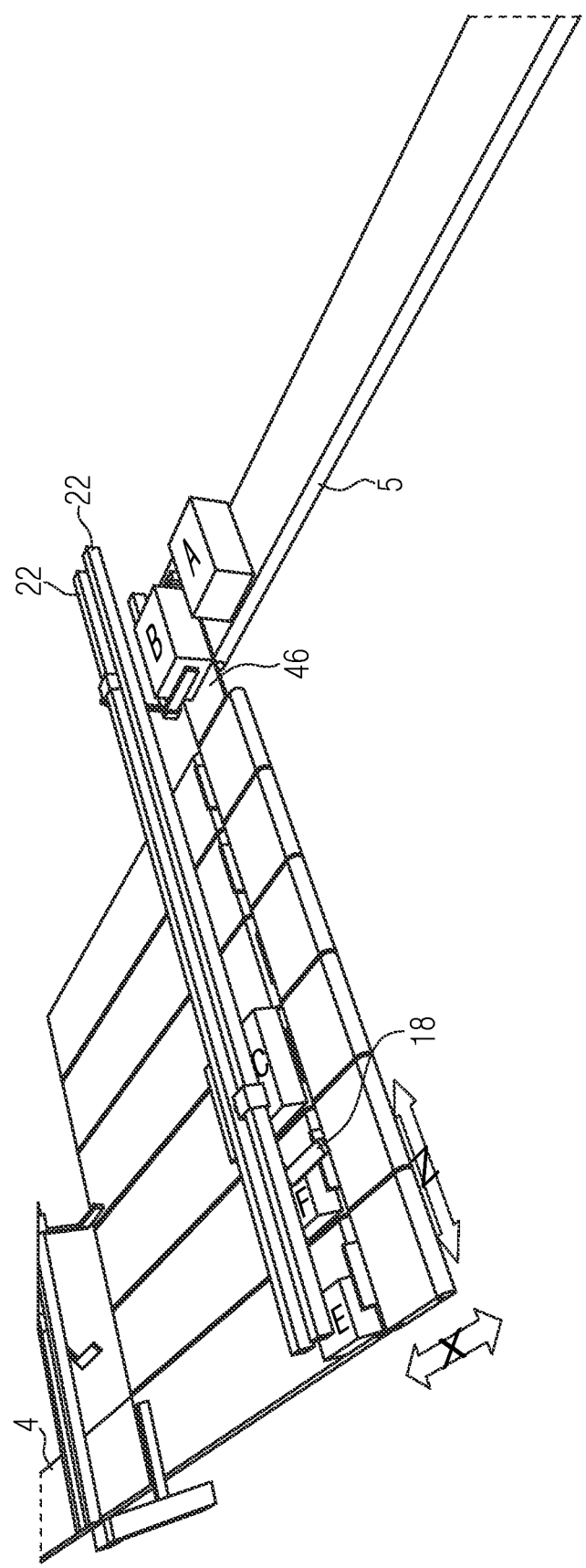
FIG. 19 is a perspective view similar to that of FIG. 18, in which the apparatus according to the invention is in another next step of the sequencing process.

FIG. 20 shows that, in a next operating step, the loading unit "C" has been released for conveying onto the separation belt 25, and is taken there by the pusher arm 18 which, as seen in FIG. 19, is still in the position pivoted backwards in which it could be moved over the loading unit "B"; the loading unit "C" undergoes displacing movement onto the push plate 46, from which the loading unit "C" can then be conveyed by means of the pusher 47 onto the conveying device 5 on which the loading units "A", "B" and "C" are then arranged in the proper order, as seen in FIG. 23. Finally, FIG. 23 shows that the loading units "A", "B", "C" and "D" have been conveyed onto the conveying device 5 as described above, so the loading units are present there in the order intended for further processing.

Similarly, the further loading units "E" and "F" are also processed so that they finally come into abutment on the conveying device 5, and the loading units "A", "B", "C", "D", "E" and "F" shown in the figures are sequenced there in the correct or proper order.

The apparatus 1 according to the invention features, inter alia, that the transverse pushers 17 and 20 are configured as double pushers, and in each case have two pusher arms which are actuated alternately—thus enabling the loading or unloading rate to be increased to about 800 containers per hour. Because the pusher arms are arranged so as to be pivotable relative to the corresponding carrying arms or to the pusher arms, that is to say can be pivoted at an angle of about 45 to 90 degrees, preferably 75 degrees, the pusher arms can be moved so that one pusher arm carries out a displacing movement on the container, while the other pusher arm carries out a return movement back to the transfer area (in which the pusher arm then either takes the next container at the inlet of the first belt or takes the container or the loading unit at the respective intake or the respective separation belt).

An automatic device, not described in any further detail, for palleting the loading units may be arranged downstream of the apparatus 1, beyond the conveying device 5, for sequencing according to the invention. It is possible to adjust the loading unit intake capacity of the sequencing zone via the number and length of the accumulation belts 7 of the sequencing zone 6. The stop devices 42 in the respective end region of the accumulation belts can, for example, be moved by means of pneumatic cylinders, that is to say lowered and raised again, the respective separation belt 25 having a higher conveying speed than the corresponding accumulation belt 7; the stop device 42 thus can be raised again for abutment of a next loading unit before the latter arrives in the area of reach of the separation belt.

The apparatus for sequencing according to the invention is controlled by a control computer which is not described in any further detail and which releases the loading units to be sequenced in a predetermined order so that the accumulation belts and the separation belts and the transverse pushers can be actuated accordingly, for example such that the order of the sequencing can be controlled on the basis of the weight of the loading unit, the type of loading unit and the dimensions of the loading unit. In this way, heavy loading units can then be stacked lowest down on the pallet, which is not described in any further detail, or in the roll cage, which is not described in any further detail, a stack of loading units then having the heaviest loading unit at the bottom, followed by lighter loading units above, it also being possible to control the stacking order in terms of identical items.

Because, according to the invention, a double transverse pusher is provided at the inlet and/or at the outlet of the sequencing zone, a high sequencing throughput of at least 800 containers per hour can be achieved. The intended use of modular chains as belts, accumulation belts or separation belts according to the invention ensures that the pusher arms are able to push the respective loading units transversely to the belts, accumulation belts and separation belts without any risk of the respective undersides of the loading units colliding with the modular chains.

As previously explained, the use of two supplementary pusher arms in each case results in a remarkably high throughput capacity. One of the pusher arms places a loading unit on the predetermined buffer belt, while the other pusher arm is already being brought into position to take the next container or the next loading unit. As soon as the first pusher arm with the container or the loading unit reaches the predetermined belt, the second pusher arm, on which the next loading unit is already arranged, can start its displacing movement together with the container or the loading unit. After the container or the loading unit has been placed on the predetermined buffer belt, the first pusher arm pivots backwards and, as it returns to the position for transferring the next container or the next loading unit, is able to move past the other moving pusher arm without any risk of the pusher arm colliding with the other pusher arm or the other pusher arm with the loading unit being moved by it.

With respect to features of the invention not specifically explained in more detail, reference is made otherwise expressly made to the claims and the drawings.

LIST OF REFERENCE NUMERALS

1. Apparatus
2. Loading unit
3. Feeding device
4. Feeding belt
5. Conveying device
6. Sequencing zone
7. Belt, belts
8. Modular belt
9. Border region
10. Edge
11. Conveying direction
12. Upper tension belt
13. Lower tension belt
14. Double arrow
15. First pusher arm
16. Second pusher arm
17. First transverse pusher
18. Third pusher arm
19. Fourth pusher arm
20. Second transverse pusher
21. First carrying arm
22. Second carrying arm
23. Separation device
24. Intake
25. Separation belt
26. Distribution device
27. First belt
28. Relocation device
29. Pivot joint
30. Belt
31. Transfer area
32. Stop device 33. Stopper
34. Pivot joint
35. Second belt
36. Pivot joint
37. Guide
38. Guide element
39. Pivot joint
40. Pivot joint
41. End region
42. Stop device
43. Stopper
44. Upper side
45. Stop device
46. Push plate
47. Pusher arm
48. Third belt
49. Fourth belt

What is claimed is:

1. An apparatus (1) for sequencing loading units (2) in a predetermined order, the apparatus comprising:
 a sequencing zone (6) with a plurality of belts (7) for receiving loading units (2) to be sequenced;
 a feeding device (3) for loading units (2), the feeding device (3) arranged upstream of the sequencing zone (6);
 a separation device (23) with intakes (24) for loading units (2), the separation device (23) arranged downstream of the sequencing zone (6) and separating loading units into separated loading units;
 a distribution device (26) for distributing the loading units (2) onto the belts (7); and
 a relocation device (28) for conveying the separated loading units (2) towards a conveying device (5) arranged downstream of the relocation device;
wherein the distribution device (26) and/or the relocation device (28) comprises at least one transverse pusher (17, 20) which pushes the loading units (2) transversely to the belts (7) or intakes (24).

2. The apparatus according to claim 1 wherein the at least one transverse pusher (17, 20) comprises at least two pusher arms (15, 16, 18, 19), pivotable relative to one another, and arranged on a corresponding carrying arm (21, 22) above and transversely to the belts (7) or intakes (27), the at least two pusher arms displaceable along the corresponding carrying arm (21, 22) and abuttable with the loading units (2).

3. The apparatus according to claim 2 wherein:
 the at least two pusher arms (15, 16, 18, 19) are pivotable relative to the corresponding carrying arm (21, 22), and are abuttable with the loading units (2) by the pivoting movement; and
 the at least two pusher arms are displaceable along the corresponding carrying arm (21, 22) in a pivoted position relative to an other pusher arm (15, 16, 18, 19).

4. The apparatus according to claim 1 wherein the intakes (24) comprise separation belts (25) which convey the loading units (2) into an area of reach of the at least one transverse pusher (17, 20).

5. The apparatus according to claim 1 wherein the feeding device (3) comprises:
 a feeding belt (4); and
 a stop device (32) between the feeding belt (4) and a first one of the plurality of belts (27) of the sequencing zone (6) adjacent to the feeding belt, on which loading units (2) conveyed onto an adjacent one of the plurality of belts (7) can be brought into abutment such that the loading units remain arranged in abutment on the stop device as the belts (7, 27) run;
wherein the loading units are movable into releasable engagement with the transverse pusher (17).

6. The apparatus according to claim 1 further comprising a stop device (42), at an end region (41) of each belt of the plurality of belts (7) adjacent to a corresponding one of the intakes (24), the stop device (42) displaceable relative to a corresponding one of the plurality of belts (7) such that a loading unit (2) arranged on the corresponding belt is conveyable by the corresponding belt toward the corresponding one of the intakes (24) when the stop device (42) is displaced.

7. The apparatus according to claim 6 wherein:
 a conveying speed of at least one of the separation belts (25) is greater than a conveying speed of an associated one of the plurality of belts (7); and
 after one of the loading units (2) has been gathered by the at least one separation belt, the stop device (42) is displaced into an abutment position relative to the corresponding one of the plurality of belts (7), such that the one of the loading units (2) conveyed by the corresponding belt (7) toward the stop device (42) comes into abutment with the stop device.

8. The apparatus according to claim 1 wherein the belts (7) and the intakes (24) comprise modular chains (8) having a chamfered border region (9) transverse to a conveying direction of the belts.

9. An apparatus for sequencing loading units (2) in a predetermined order comprising:
 a sequencing zone (6) with a plurality of belts (7) for receiving loading units (2) to be sequenced;
 a feeding device (3) for loading units (2) arranged upstream of the sequencing zone (6);
 a separation device (23) with intakes (24) for loading units (2) arranged downstream of the sequencing zone (6);
 a distribution device (26) for distributing the loading units (2) onto the belts (7);
 a relocation device (28) for conveying separated loading units (2) towards a conveying device (5);
wherein the loading units (2) are displaceable relative to the belts (7) of the sequencing zone (6) by a first transverse pusher (17).

10. The apparatus according to claim 9 wherein the loading units (2) are displaced, relative to the intakes (24), by a second transverse pusher (20).

11. The apparatus according to claim 10 wherein the each of the transverse pushers (17, 20) comprises two pusher arms (15, 16, 18, 19) pivotable relative to one another, and the pusher arms (15, 16, 18, 19) are displaceable on a corresponding carrying arm (21, 22) transversely to a conveying direction of the belts (7), wherein one of a first pair of pusher arms (15, 16) conveys one of the loading units towards a respective belt (7), while another of the first pair of pusher arms (15, 16) is displaced in a position pivoted with respect to the first carrying arm (21) towards a first belt (27) adjacent the feeding device (3).

* * * * *